United States Patent
Kamigaki et al.

(10) Patent No.: US 11,392,015 B2
(45) Date of Patent: Jul. 19, 2022

(54) PROJECTION LENS AND PROJECTION DEVICE

(71) Applicant: FUJIFILM Corporation, Tokyo (JP)

(72) Inventors: Tetsuo Kamigaki, Saitama (JP); Hitoshi Shimizu, Saitama (JP); Yasuto Kuroda, Saitama (JP); Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/244,244

(22) Filed: Apr. 29, 2021

(65) Prior Publication Data

US 2021/0255528 A1    Aug. 19, 2021

Related U.S. Application Data

(63) Continuation of application No. PCT/JP2019/043268, filed on Nov. 5, 2019.

(30) Foreign Application Priority Data

Nov. 2, 2018    (JP) .............................. JP2018-207739

(51) Int. Cl.
    *G03B 21/28*    (2006.01)
    *G03B 21/14*    (2006.01)
    *G03B 21/20*    (2006.01)

(52) U.S. Cl.
    CPC ....... *G03B 21/142* (2013.01); *G03B 21/2033* (2013.01); *G03B 21/28* (2013.01)

(58) Field of Classification Search
    CPC ...... G03B 21/00; G03B 21/14; G03B 21/142; G03B 21/2033; G03B 21/28
    (Continued)

(56) References Cited

U.S. PATENT DOCUMENTS 11,119,393 B2 *  9/2021  Amano ................. G03B 21/30
11,194,235 B2 * 12/2021  Amano ................. G02B 7/021
(Continued)

FOREIGN PATENT DOCUMENTS

JP    9-197341 A       7/1997
JP    2006-119407 A    5/2006
(Continued)

OTHER PUBLICATIONS

International Preliminary Report on Patentability and Written Opinion of the International Searching Authority, with an English translation (forms PCT/IB/373, PCT/ISA/237 and PCT/IB/326), dated May 14, 2021, for corresponding International Application No. PCT/JP2019/043268.

(Continued)

*Primary Examiner* — William C. Dowling
(74) *Attorney, Agent, or Firm* — Birch, Stewart, Kolasch & Birch, LLP

(57) ABSTRACT

A projection lens that is mounted on a housing of a projection device including an electro-optical element includes a first holding unit which is connected to the housing and through which light parallel to a first optical axis serving as an optical axis corresponding to luminous flux incident from the housing passes, a second holding unit through which light parallel to a second optical axis obtained from bending of the light parallel to the first optical axis passes and which is rotated with respect to the first holding unit in a rotatable range less than 360°, a first rotation control unit that controls rotation of the second holding unit, and a first electric drive unit. The first rotation control unit is provided on a first outer peripheral surface of one of the first holding unit and the second holding unit. The first electric drive unit is provided on a second outer peripheral surface of the other of the first holding unit and the second holding unit. The first rotation (Continued)

control unit and the first electric drive unit are in a relationship where the first rotation control unit and the first electric drive unit overlap with each other in an extending direction of the first optical axis, and the first rotation control unit and the first electric drive unit are spaced apart from each other in the rotatable range.

20 Claims, 15 Drawing Sheets

(58) Field of Classification Search
USPC .................................................. 353/100, 101
See application file for complete search history.

(56) References Cited

U.S. PATENT DOCUMENTS

| | | |
|---|---|---|
| 2006/0087627 A1 | 4/2006 | Furumi |
| 2009/0033888 A1 | 2/2009 | Nozaki et al. |
| 2019/0025679 A1 | 1/2019 | Kuroda |
| 2019/0219802 A1 | 7/2019 | Kuroda |
| 2019/0219915 A1 | 7/2019 | Kayano |
| 2021/0247673 A1* | 8/2021 | Kamigaki ............... H04N 5/74 |
| 2021/0247683 A1* | 8/2021 | Kamigaki ............ G03B 21/145 |
| 2021/0247684 A1* | 8/2021 | Kamigaki ................ G02B 7/04 |
| 2021/0250557 A1* | 8/2021 | Shimizu ............... G03B 21/145 |

FOREIGN PATENT DOCUMENTS

| | | |
|---|---|---|
| JP | 2007-78808 A | 3/2007 |
| JP | 2009-198550 A | 9/2009 |
| JP | 2012-98506 A | 5/2012 |
| JP | 2015-11324 A | 1/2015 |
| JP | 2015-148669 A | 8/2015 |
| JP | 2017-142726 A | 8/2017 |
| WO | WO 2017/169903 A1 | 10/2017 |
| WO | WO 2018/055963 A1 | 3/2018 |
| WO | WO 2018/055964 A1 | 3/2018 |

OTHER PUBLICATIONS

International Search Report (form PCT/ISA/210), dated Jan. 21, 2020, for corresponding International Application No. PCT/JP2019/043268, with an English translation.
Japanese Office Action, dated Aug. 27, 2019, for corresponding Japanese Application No. 2018-207739, with an English translation.
Office Action dated Feb. 23, 2022 for Chinese Patent Application No. 201980072571.7, with machine English translation.

\* cited by examiner

PROJECTION LENS AND PROJECTION DEVICE

CROSS-REFERENCE TO RELATED APPLICATIONS

This application is a continuation application of International Application No. PCT/JP2019/043268, filed on Nov. 5, 2019, which is incorporated herein by reference in its entirety. Further, this application claims priority from Japanese Patent Application No. 2018-207739, filed on Nov. 2, 2018, the disclosure of which is incorporated by reference herein in its entirety.

BACKGROUND

Technical Field

The technique of the present disclosure relates to a projection lens and a projection device.

Related Art

A projector as a projection device for projecting an image on a screen has been widely distributed. A projector comprises, for example, an image forming panel, such as a liquid crystal display (LCD) or a digital micromirror device (DMD: registered trademark), and a projection lens that projects the image formed by the image forming panel on a screen.

A projector comprising a projection lens, which can change the projection direction of an image, has been developed as such a projector (see WO2018/055964A). In the projector disclosed in WO2018/055964A, an image forming panel is housed in a body part and a projection lens is mounted on the outer peripheral surface of the body part.

In the projector disclosed in WO2018/055964A, luminous flux representing an image formed by the image forming panel is incident on the projection lens from the body part. The projection lens comprises a bending optical system having three optical axes, that is, a first optical axis, a second optical axis, and a third optical axis in this order from an incident side. The first optical axis is an optical axis corresponding to luminous flux incident from the body part, and the second optical axis is bent at an angle of 90° from the first optical axis. The third optical axis is an emission optical axis which is bent at an angle of 90° from the second optical axis and along which luminous flux is emitted to a screen.

The projection lens includes an incident-side end part, an intermediate part, and an emission-side end part. The incident-side end part corresponds to the first optical axis. The intermediate part corresponds to the second optical axis. The emission-side end part corresponds to the third optical axis. The incident-side end part is non-rotatably mounted on the body part, and the intermediate part is rotated about the first optical axis with respect to the incident-side end part. Since the emission-side end part is connected to the intermediate part, the emission-side end part is also rotated about the first optical axis in a case where the intermediate part is rotated. Further, the emission-side end part is rotated about the second optical axis with respect to the intermediate part. Since the emission-side end part is rotated about the first optical axis and the second optical axis as described above, the projection direction is changed.

The projection lens is provided with, for example, various control units including an optical system control unit that controls the drive of an optical system and a rotation control unit that controls the rotation of a holding unit for an optical system, such as an intermediate part or an emission-side end part. There is a concern that the rotation of the holding unit may be hindered depending on the installation position of such a control unit. However, WO2018/055964A does not disclose countermeasures for a concern that the rotation of the holding unit may be hindered depending on the installation position of the control unit.

SUMMARY

An object of a technique of the disclosure is to provide a projection lens and a projection device having no concern that the rotation of a holding unit may be hindered.

In order to achieve the above-mentioned object, a projection lens according to an aspect of the disclosure is mounted on a housing of a projection device including an electro-optical element and comprises a first holding unit which is connected to the housing and through which light parallel to a first optical axis serving as an optical axis corresponding to luminous flux incident from the housing passes, a second holding unit through which light parallel to a second optical axis obtained from bending of the light parallel to the first optical axis passes and which is rotated with respect to the first holding unit in a rotatable range less than 360°, a first rotation control unit that controls rotation of the second holding unit, and a first electric drive unit. The first rotation control unit is provided on a first outer peripheral surface of one of the first holding unit and the second holding unit, the first electric drive unit is provided on a second outer peripheral surface of the other of the first holding unit and the second holding unit, the first rotation control unit and the first electric drive unit are in a relationship where the first rotation control unit and the first electric drive unit overlap with each other in an extending direction of the first optical axis, and the first rotation control unit and the first electric drive unit are spaced apart from each other in the rotatable range.

It is preferable that the first electric drive unit and the first rotation control unit are provided at positions corresponding to each other so as to be shifted from each other in a rotation direction of the second holding unit.

It is preferable that the first rotation control unit includes an extending part extending toward the second outer peripheral surface and the extending part overlaps with the first electric drive unit in the extending direction of the first optical axis.

It is preferable that the extending part is fitted to a groove provided to lock rotation of the second holding unit.

It is preferable that the first electric drive unit includes an extending part extending toward the first outer peripheral surface and the extending part overlaps with the first rotation control unit in the extending direction of the first optical axis.

It is preferable that the projection lens further comprises a third holding unit through which light parallel to a third optical axis obtained from bending of the light parallel to the second optical axis passes and which is rotated by an angle of 360° with respect to the second holding unit, a second rotation control unit controlling rotation of the third holding unit, and a second electric drive unit, one of the second rotation control unit and the second electric drive unit is provided on a third outer peripheral surface of the second holding unit, and the other of the second rotation control unit and the second electric drive unit is provided on one side of a fourth outer peripheral surface of the third holding unit corresponding to an extending direction of the second optical axis.

Further, a projection lens according to another aspect of the disclosure is mounted on a housing of a projection device including an electro-optical element and comprises a first holding unit which is connected to the housing and through which light parallel to a first optical axis serving as an optical axis corresponding to luminous flux incident from the housing passes, a second holding unit through which light parallel to a second optical axis obtained from bending of the light parallel to the first optical axis passes and which is rotated with respect to the first holding unit in a rotatable range less than 360°, a third holding unit through which light parallel to a third optical axis obtained from bending of the light parallel to the second optical axis passes and which is rotated with respect to the second holding unit, a first rotation control unit that controls rotation of the second holding unit, a second rotation control unit that controls rotation of the third holding unit, and a first electric drive unit. The second rotation control unit is provided on a first outer peripheral surface of one of the first holding unit and the second holding unit, the first electric drive unit is provided on a second outer peripheral surface of the other of the first holding unit and the second holding unit, the second rotation control unit and the first electric drive unit are in a relationship where the second rotation control unit and the first electric drive unit overlap with each other in an extending direction of the second optical axis, and the second rotation control unit and the first electric drive unit are spaced apart from each other in the rotatable range.

It is preferable that the first electric drive unit and the second rotation control unit are provided at positions corresponding to each other so as to be shifted from each other in a rotation direction of the second holding unit.

It is preferable that the projection lens further comprises a second electric drive unit, the third holding unit is rotated by an angle of 360° with respect to the second holding unit, and the second electric drive unit is provided on a fourth outer peripheral surface of the third holding unit and does not overlap with the second rotation control unit in the extending direction of the second optical axis.

A projection device according to another aspect of the disclosure comprises an electro-optical element, a housing that stores the electro-optical element and includes a central portion and a protruding portion protruding from the central portion, a depressed portion that is adjacent to the protruding portion, and the projection lens according to any one of claims 1 to 9 that is disposed in the depressed portion and projects light emitted from the electro-optical element.

According to the technique of the disclosure, it is possible to provide a projection lens and a projection device having no concern that the rotation of a holding unit may be hindered.

Figure 8:
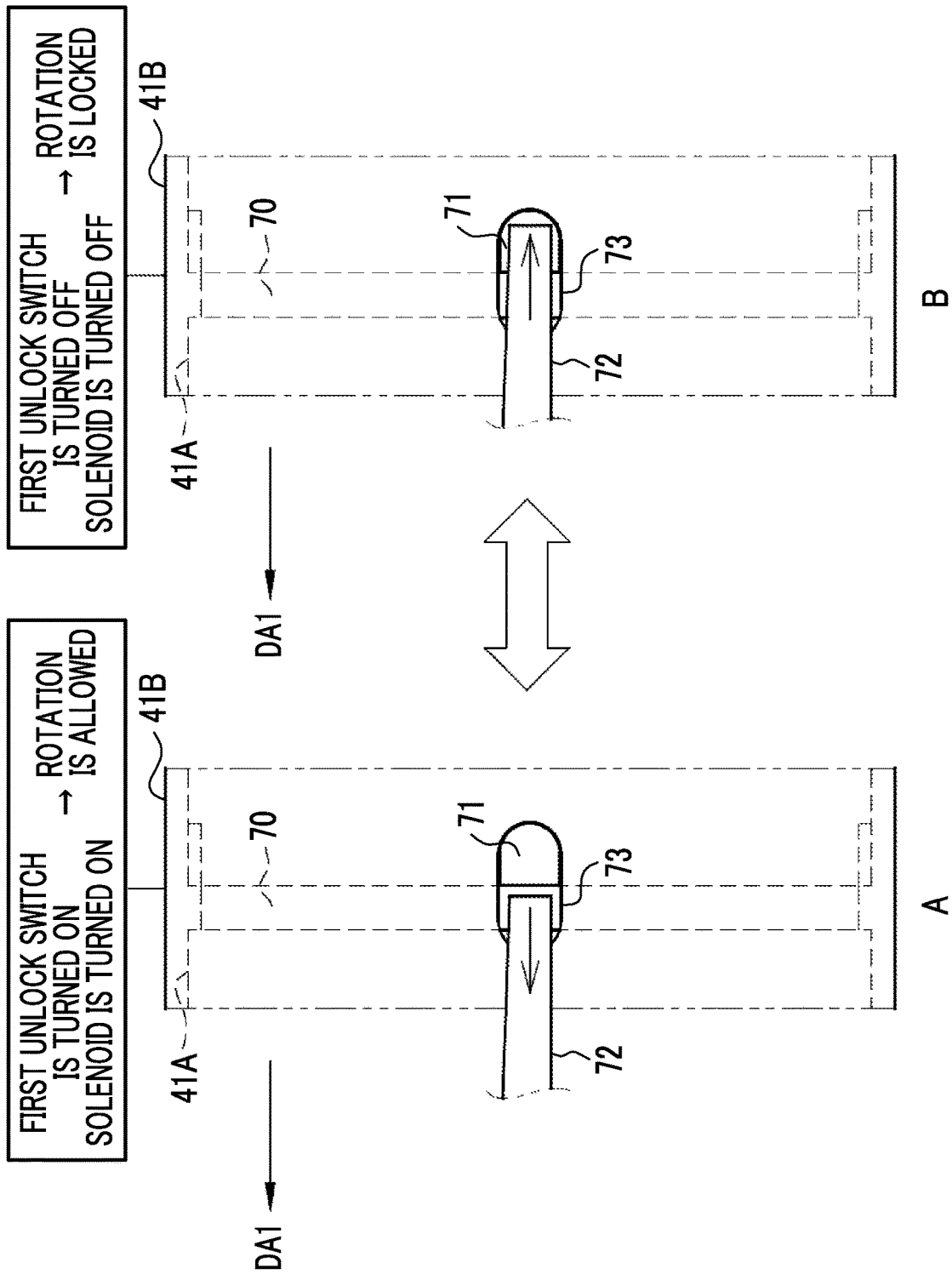

A and B of FIG. 8 are diagrams showing a first rotation locking mechanism, A of FIG. 8 shows a state where a distal end of an arm is moved to a position where the distal end of the arm is engaged with a guide groove, and B of FIG. 8 shows a state where the distal end of the arm is moved to a position where the distal end of the arm is engaged with a lock groove.

Figure 9:
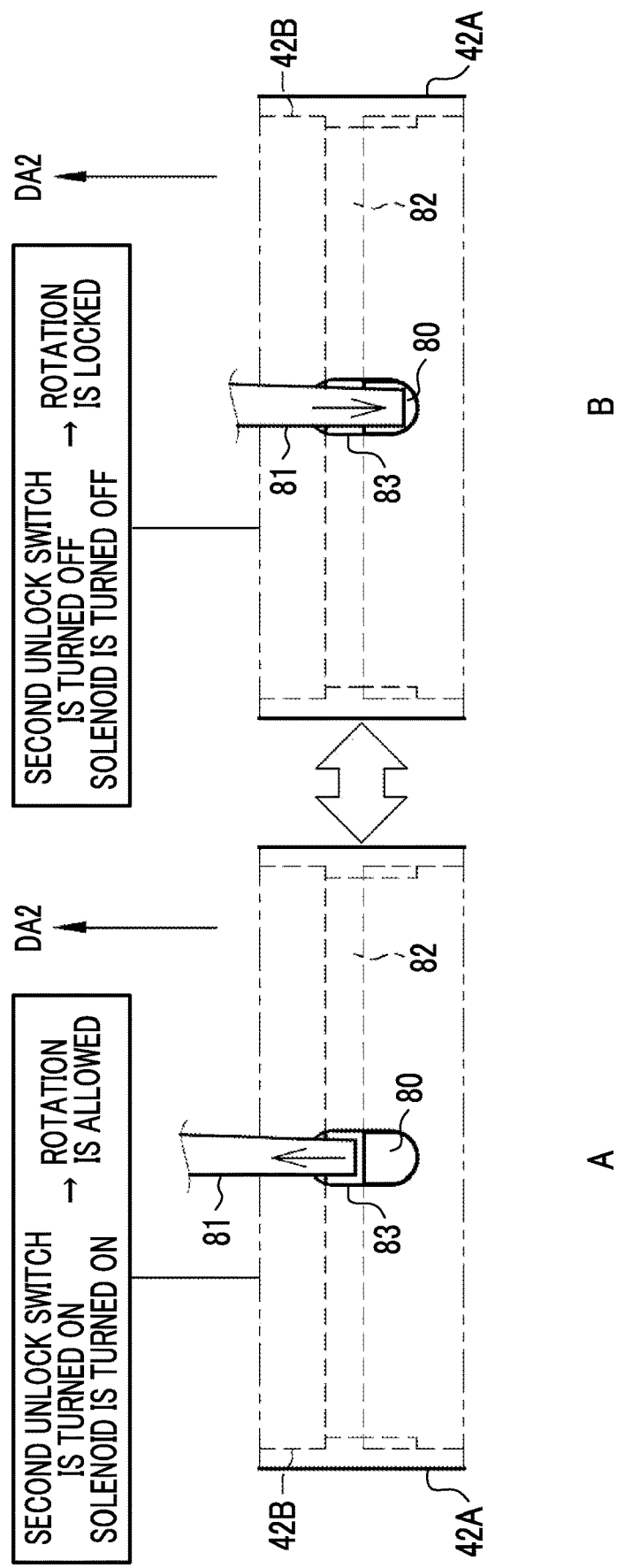

A and B of FIG. 9 are diagrams showing a second rotation locking mechanism, A of FIG. 9 shows a state where a distal end of an arm is moved to a position where the distal end of the arm is engaged with a guide groove, and B of FIG. 9 shows a state where the distal end of the arm is moved to a position where the distal end of the arm is engaged with a lock groove.

Figure 10:
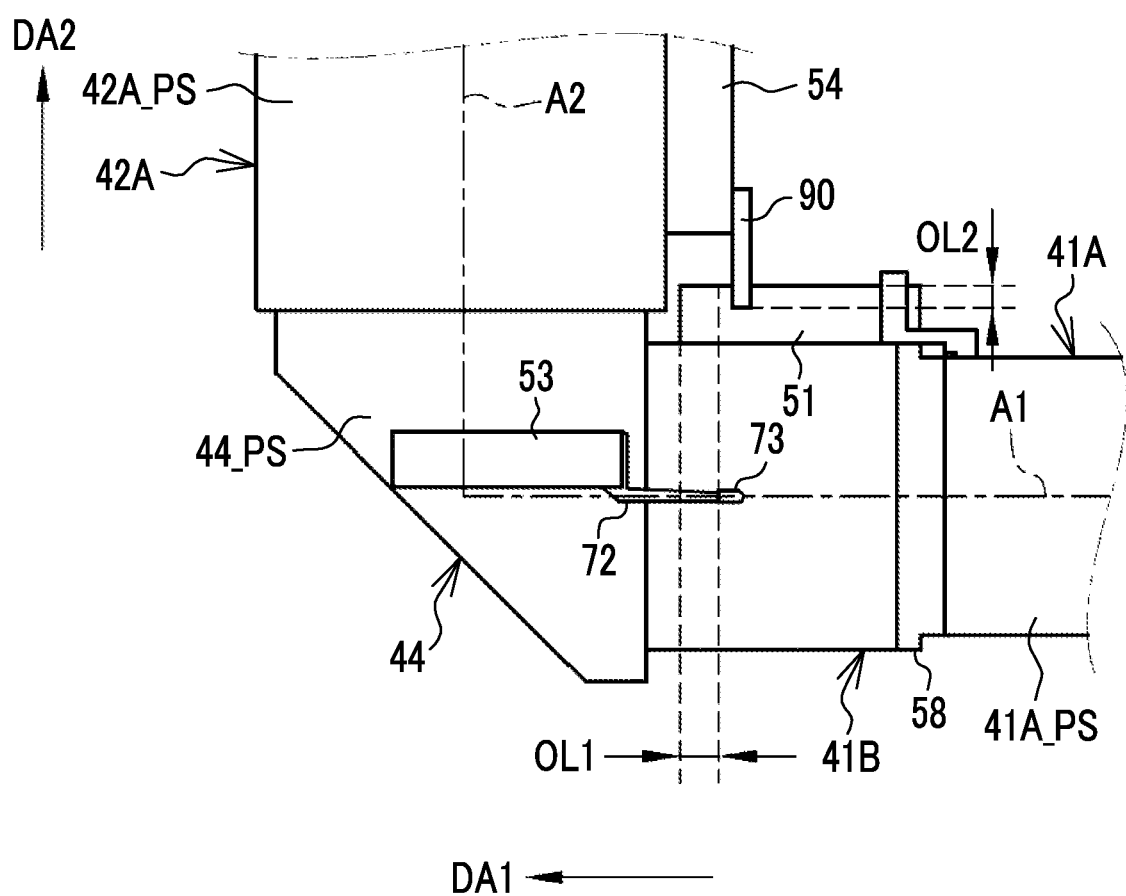

FIG. 10 is a plan view showing a part of a first lens barrel unit, a first mirror holding part, and a part of a second lens barrel unit.

Figure 11:
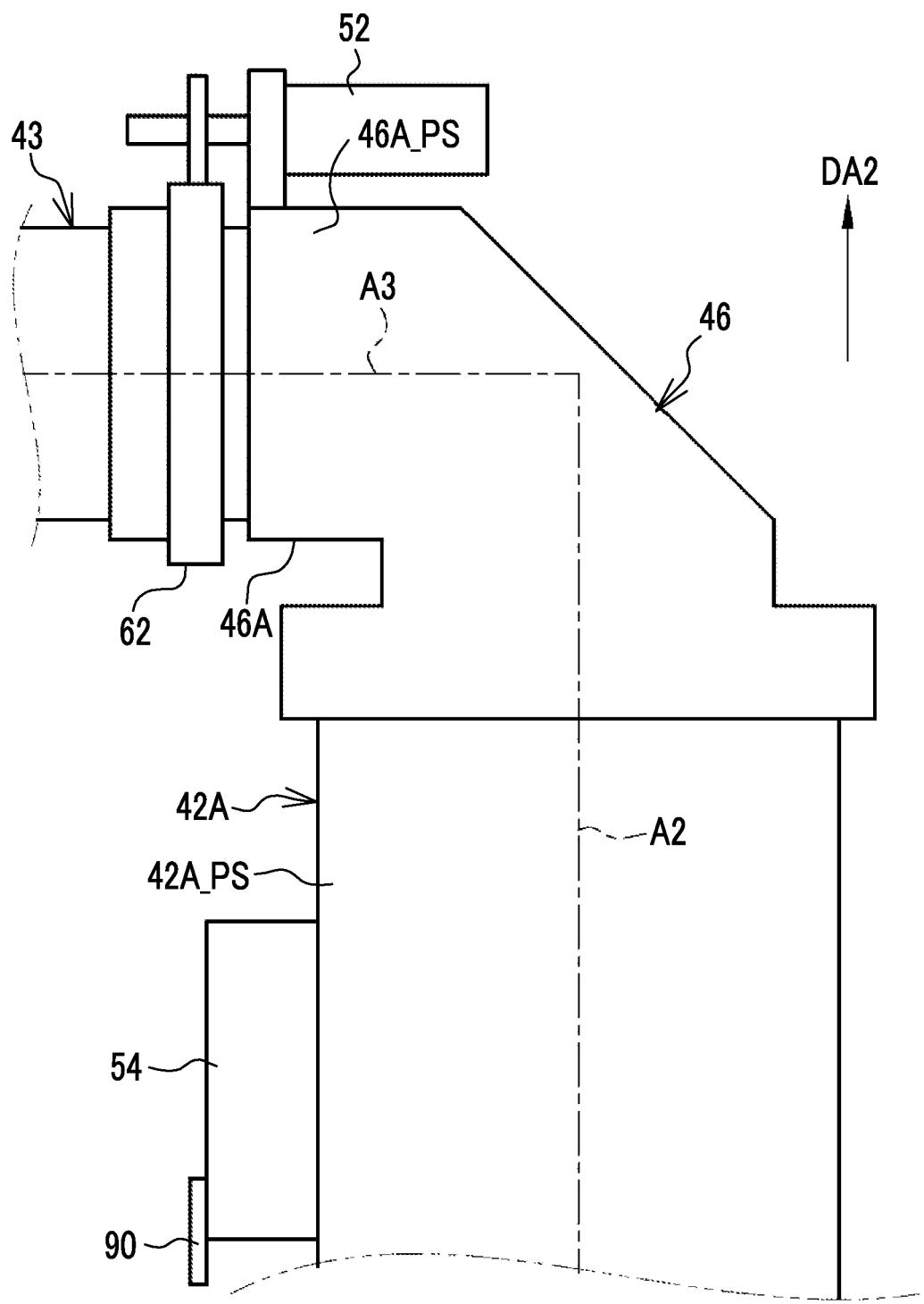

FIG. 11 is a plan view showing a part of a second lens barrel unit, a second mirror holding part, and a part of a third lens barrel unit.

Figure 1:
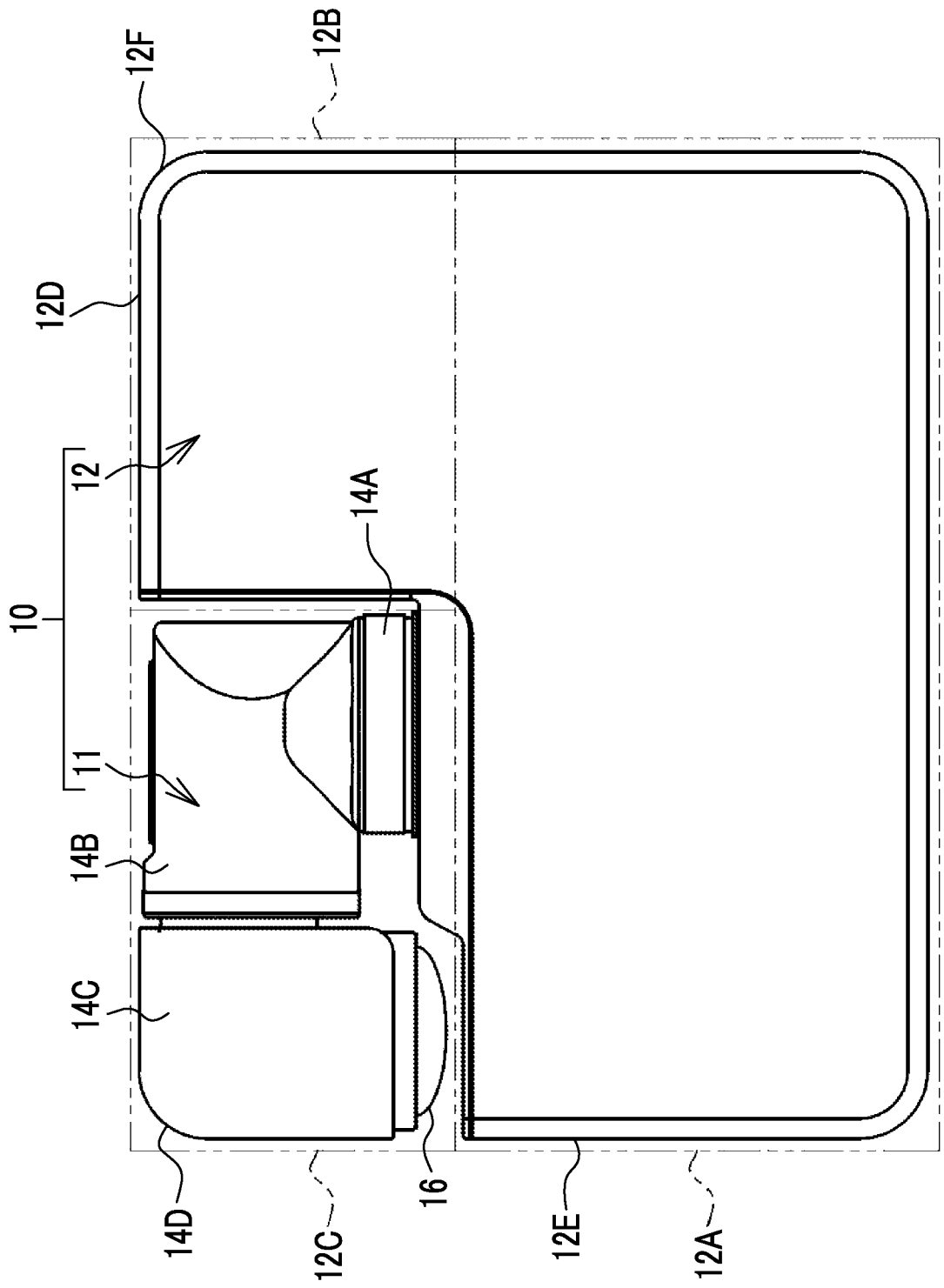
FIG. 1 is a plan view of a projector.
Figure 2:
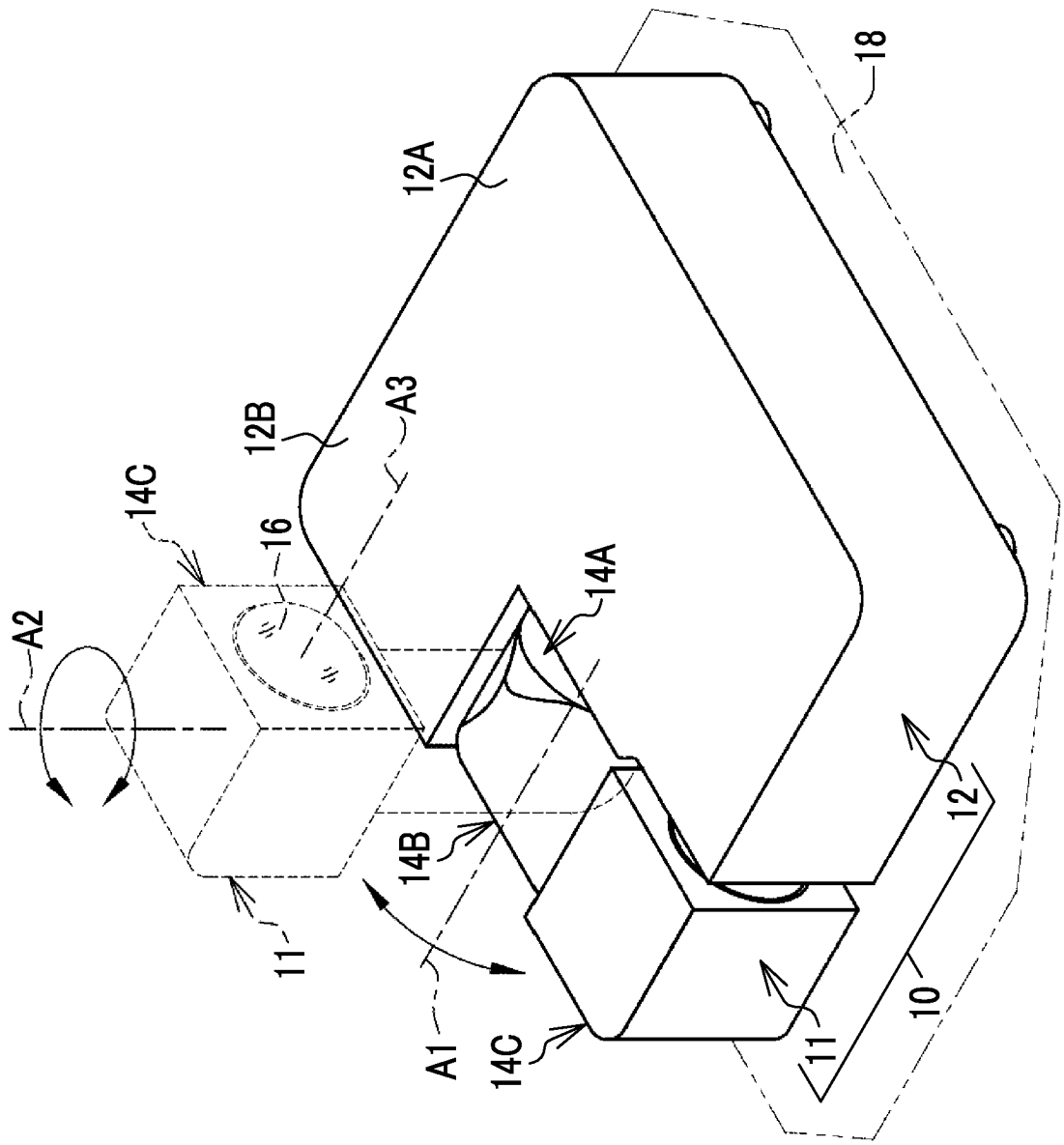
FIG. 2 is a perspective view of the horizontally placed projector.
Figure 4:
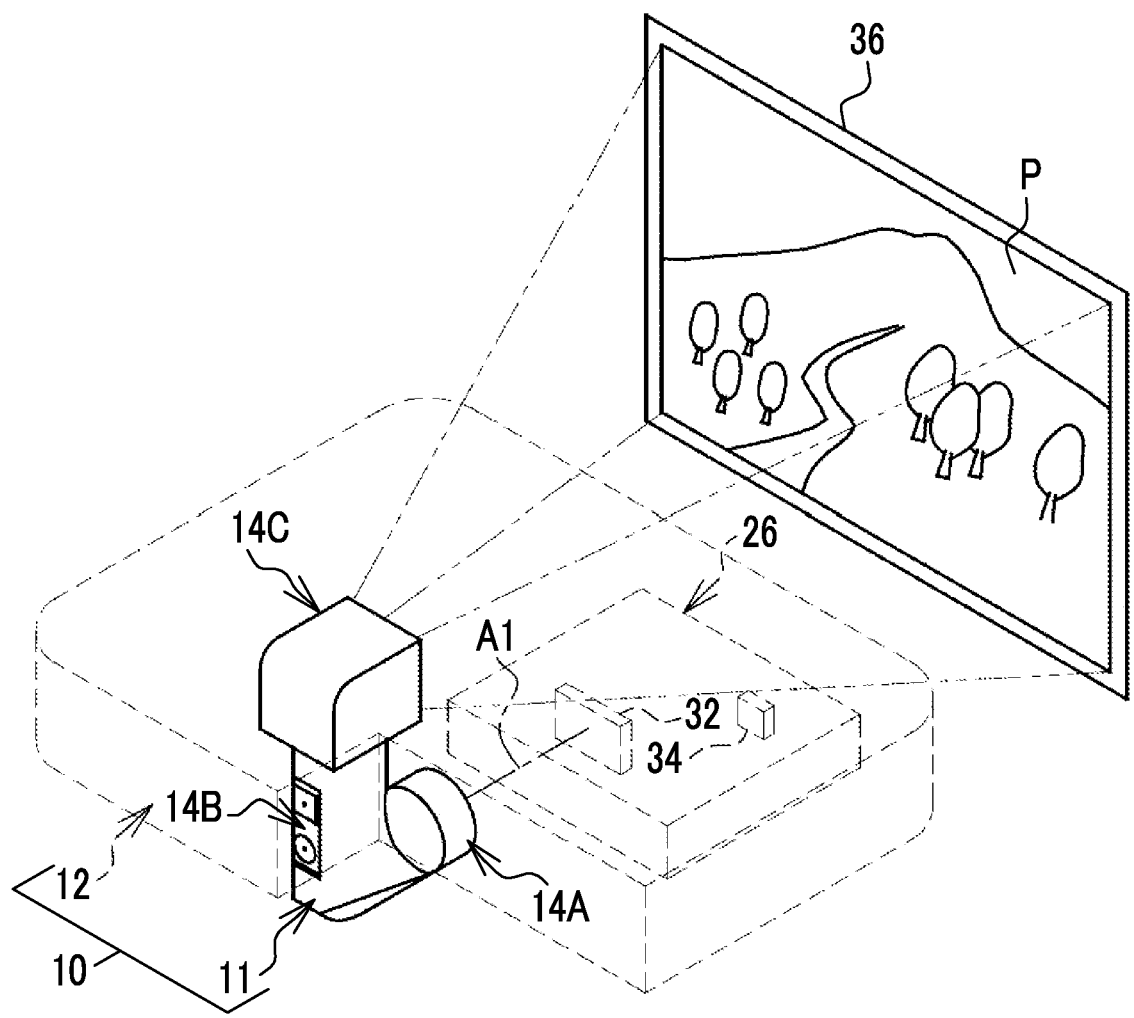
FIG. 4 is a diagram showing an aspect where the projector is used to project an image on a screen.
Figure 12C:
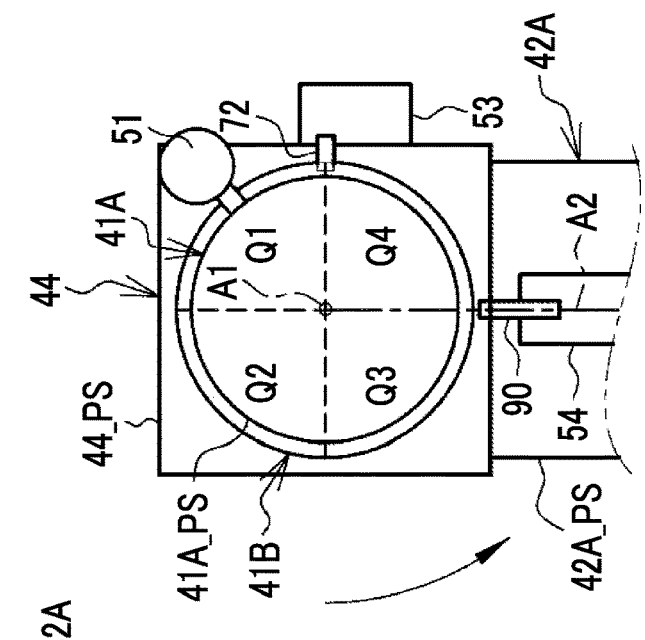
Figure 12B:
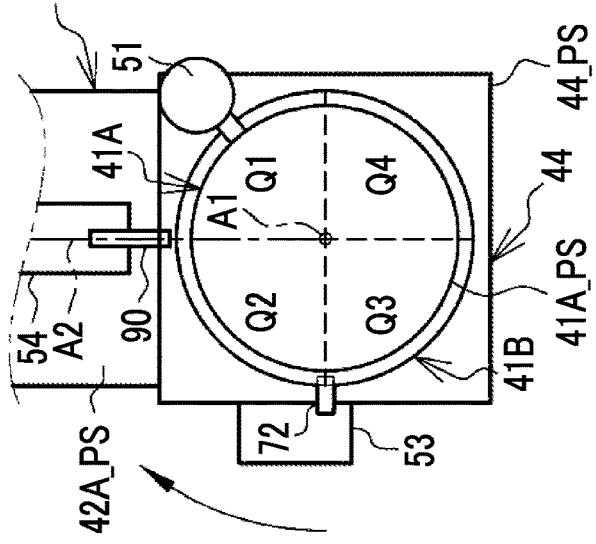
Figure 12A:
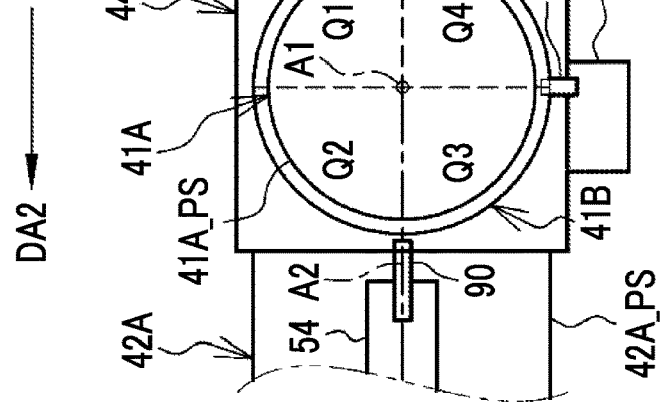

FIGS. 12A, 12B, and 12C are plan views showing a positional relationship between a zoom motor and two solenoids in a case where the lens barrel is viewed from a body part, FIG. 12A shows the positional relationship in a storage state shown in FIG. 1 and the like, FIG. 12B shows the positional relationship in a state shown in FIGS. 2 and 4 and the like, and FIG. 12C shows the positional relationship in a state where an outer barrel is rotated to a side opposite to a state shown in FIGS. 2 and 4 and the like.

Figure 13:
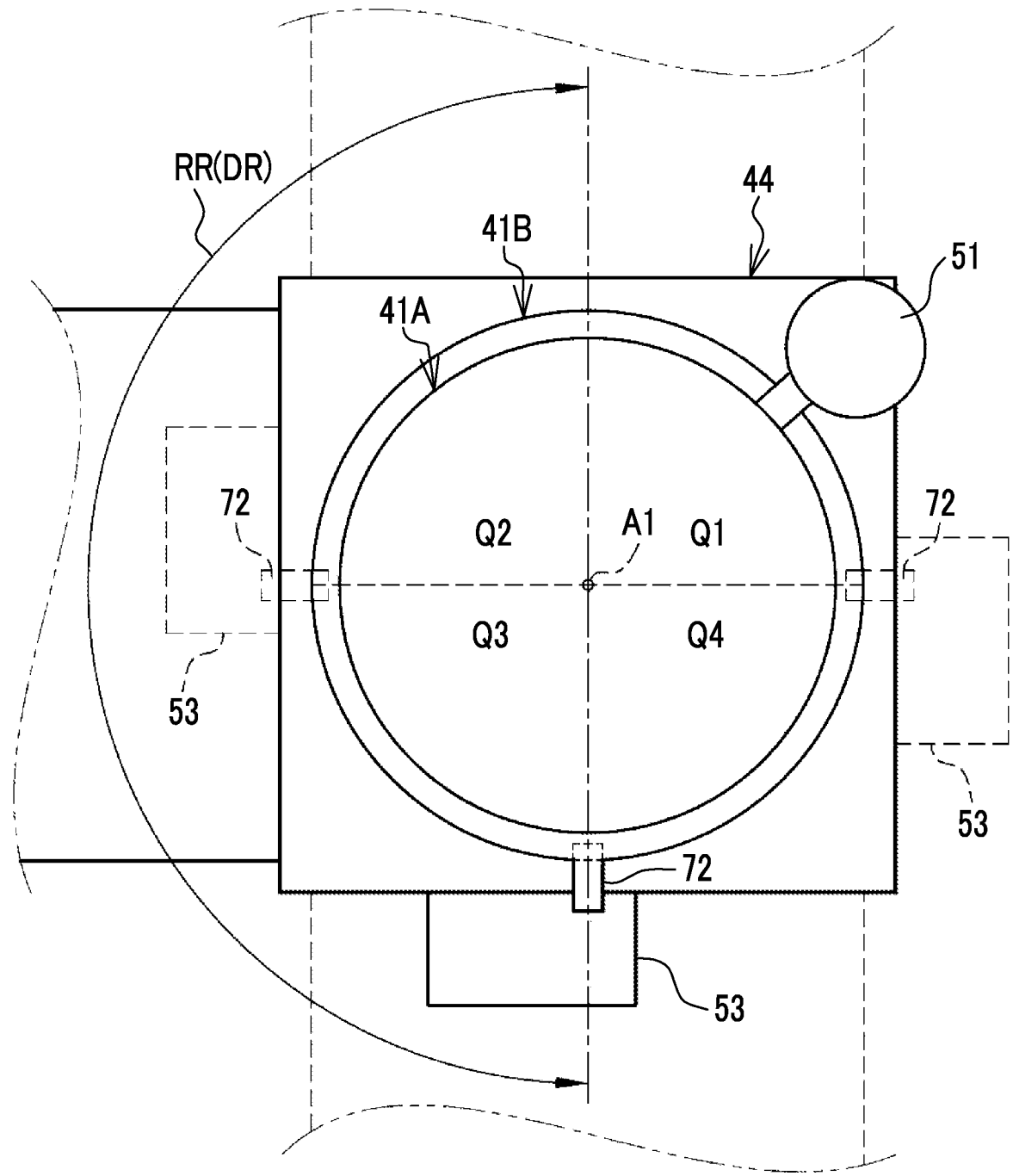

FIG. 13 is a plan view collectively showing the states of FIGS. 12A to 12C.

Figure 14:
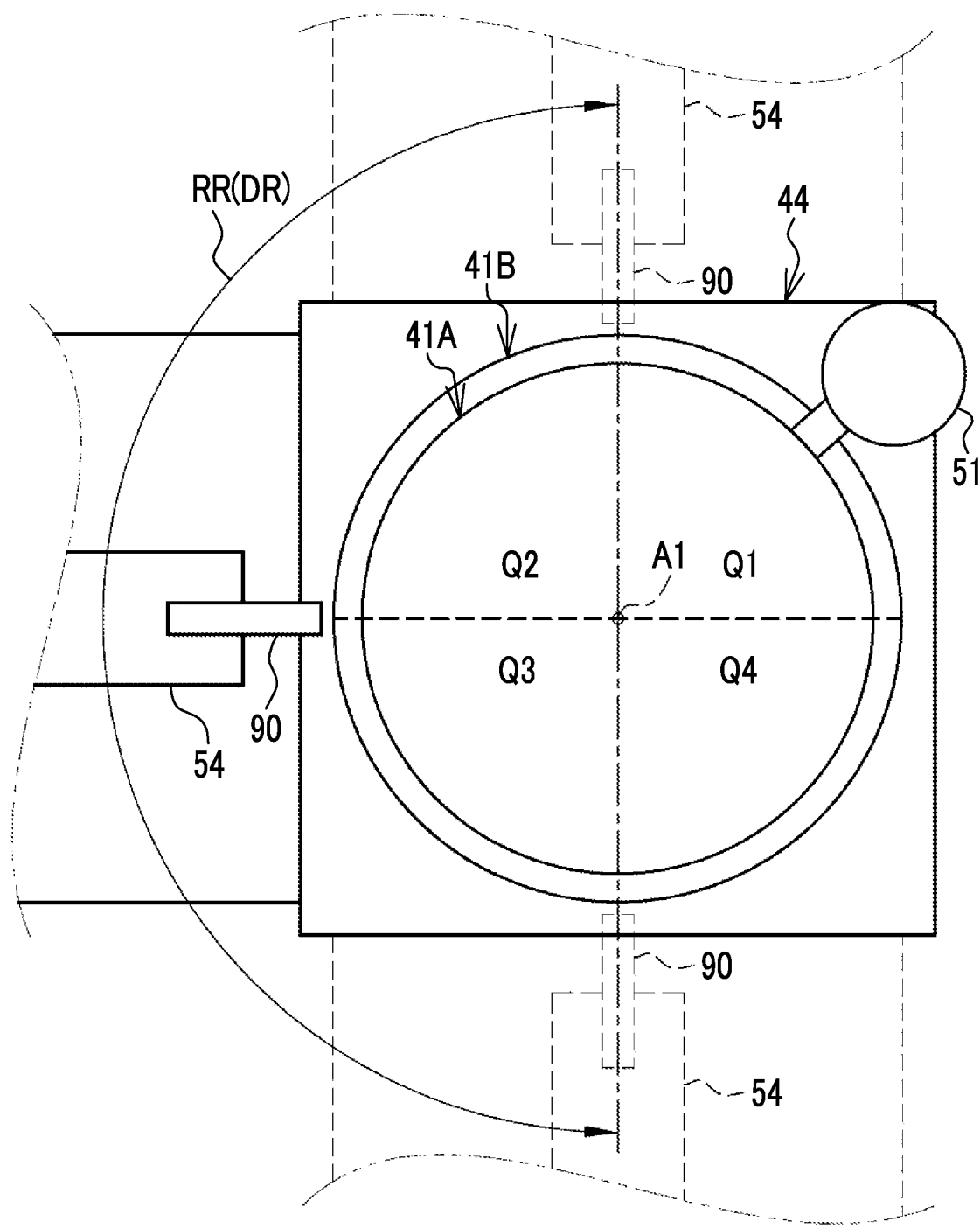

FIG. 14 is a plan view collectively showing the states of FIGS. 12A to 12C.

Figure 15:
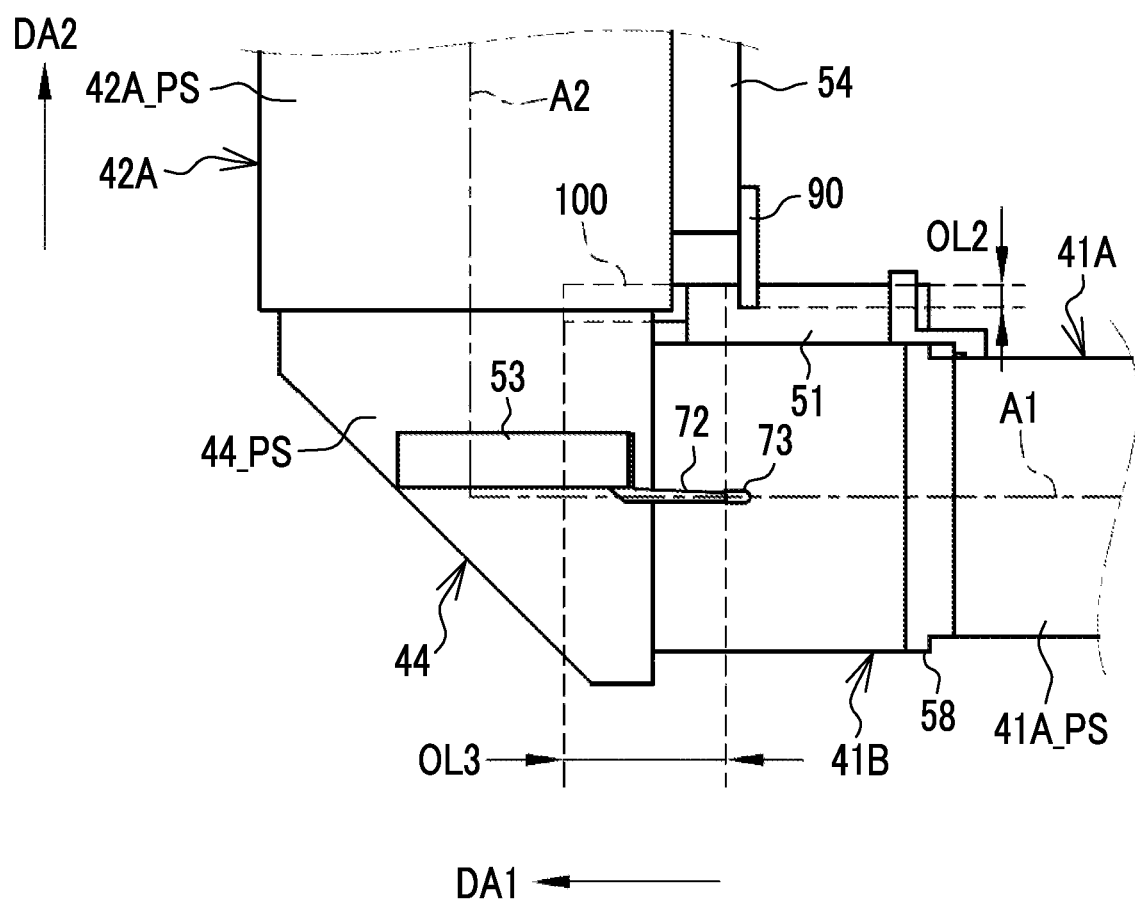

FIG. 15 is a diagram showing an example where an extending part of the zoom motor overlaps with the solenoid in an extending direction of a first optical axis.

DETAILED DESCRIPTION

An example of an embodiment of a technique of the disclosure will be described below with reference to the drawings.

Terms, such as "first", "second", and "third", used in this specification are added to avoid the confusion of components and do not limit the number of components present in a projection device or a projection lens.

As shown in FIG. 1, a projector 10 according to this embodiment corresponds to a projection device and comprises a projection lens 11 and a body part 12. The body part 12 corresponds to a housing. One end portion of the projection lens 11 is mounted on the body part 12. FIG. 1 shows a storage state where the projection lens 11 is stored in a case where the projector 10 is not in use.

The body part 12 comprises a base portion 12A, a protruding portion 12B, and a storage portion 12C. The base portion 12A houses main components, such as an image forming unit 26 (see FIG. 4) and a control board (not shown). The base portion 12A corresponds to a central portion. The base portion 12A has a substantially rectangular shape that is horizontally long in a plan view shown in FIG. 1.

The protruding portion 12B protrudes from one side of the base portion 12A. The protruding portion 12B has a substantially rectangular shape, and the width of the protruding portion 12B is about a half of the length of one side of the base portion 12A. For this reason, the body part 12 has a substantially L-shape in a plan view as a whole including the base portion 12A and the protruding portion 12B.

The storage portion 12C stores the projection lens 11. In FIG. 1, the storage portion 12C is a space formed on the left side of the protruding portion 12B and has a substantially rectangular shape in a plan view like the protruding portion 12B. That is, it is assumed that a side surface 12D provided on the upper side and a side surface 12E provided on the left side in FIG. 1 among the outer peripheral surfaces of the body part 12 extend in directions where the side surface 12D and the side surface 12E cross each other. A space, which is defined using the respective extending side surfaces 12D and 12E as outer edges, is the storage portion 12C. For this reason, the body part 12 has a substantially L-shape by itself, but has a substantially rectangular shape in a plan view as a whole including the storage portion 12C. Since the storage portion 12C can also be regarded as a portion depressed toward the base portion 12A from the height of the protruding portion 12B in a case where the projector 10 is vertically placed, the storage portion 12C corresponds to a depressed portion.

In a case where the projector 10 is not in use, the projection lens 11 is stored in the storage portion 12C after being transformed not to protrude from the rectangular storage portion 12C. For this reason, since the projector 10 has a substantially rectangular parallelepiped shape as a whole in which the L-shaped body part 12 and the projection lens 11 are combined with each other, the unevenness of the outer peripheral surfaces is reduced in the storage state as shown in FIG. 1. Accordingly, it is easy to carry and store the projector 10 in the storage state.

Luminous flux representing an image formed by the image forming unit 26 is incident on the projection lens 11 from the body part 12. The projection lens 11 enlarges image light, which is based on the incident luminous flux, by an optical system and forms an image. Accordingly, the projection lens 11 projects the enlarged image of the image, which is formed by the image forming unit 26, on a screen 36 (see FIG. 4).

Since the projection lens 11 includes a bending optical system (see FIGS. 2 and 3) for bending an optical axis twice by way of example, the projection lens 11 has a substantially U-shape convex upward as a whole in the storage state shown in FIG. 1. The projection lens 11 comprises an incident-side end part 14A, an intermediate part 14B, and an emission-side end part 14C. The incident-side end part 14A is connected to one end of both ends of the intermediate part 14B, and the emission-side end part 14C is connected to the other end of both ends of the intermediate part 14B. Light emitted from the body part 12 is incident on the incident-side end part 14A. The emission-side end part 14C is provided with an emission lens 16. Light, which is incident on the incident-side end part 14A from the body part 12, is guided to the emission-side end part 14C through the intermediate part 14B. The emission-side end part 14C emits light, which is guided from the body part 12 through the incident-side end part 14A and the intermediate part 14B, to the screen 36 from the emission lens 16.

The incident-side end part 14A is mounted on the body part 12 and includes a first lens barrel unit 41 (see FIG. 5), which will be described later, therein. The mounting position of the incident-side end part 14A is a position adjacent to the protruding portion 12B in a horizontal direction in FIG. 1, and is positioned near the middle of the base portion 12A. In the storage state of the projection lens 11, the intermediate part 14B extends from near the middle of the base portion 12A toward an end portion thereof opposite to the protruding portion 12B, that is, the left side in FIG. 1. Further, the intermediate part 14B includes a first mirror holding part 44 and a second lens barrel unit 42 (see FIG. 5), which will be described later, therein. A corner 14D of the emission-side end part 14C and a corner 12F of the protruding portion 12B are disposed at positions that are substantially symmetric with each other in the horizontal direction in FIG. 1. The emission-side end part 14C includes a second mirror holding part 46 and a third lens barrel unit 43 (see FIG. 5), which will be described later, therein.

Since the appearance of the emission-side end part 14C is formed in substantially the same shape as the appearance of the protruding portion 12B, the appearance of the projection lens 11 and the appearance of the body part 12 are caused to have unity. For this reason, the appearance of the projection lens 11 is designed as if the appearance of the projection lens 11 forms a part of the appearance of the body part 12 in the storage state.

Figure 3:
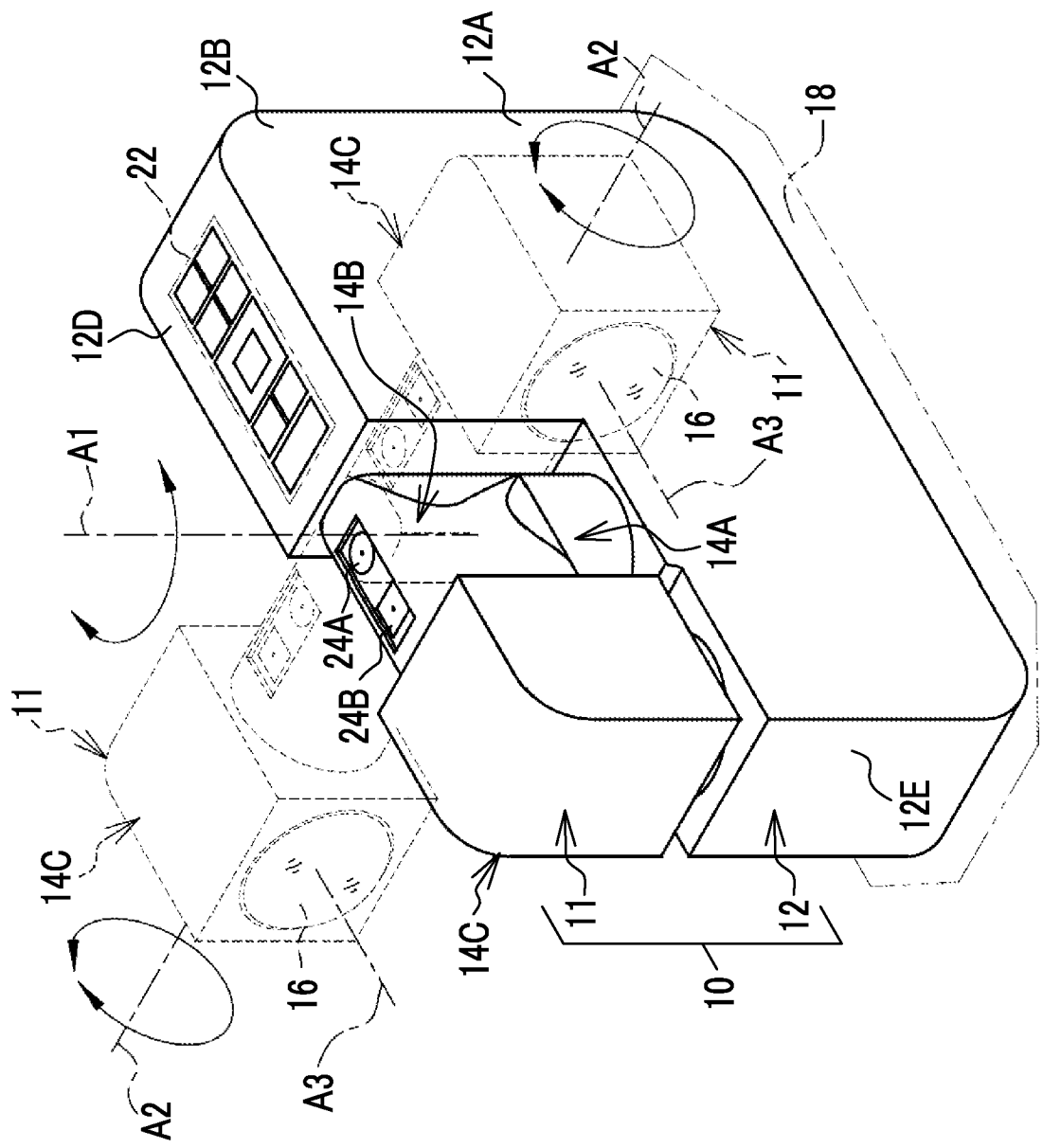
FIG. 3 is a perspective view of the vertically placed projector.

As shown in FIGS. 2 and 3, the projection lens 11 comprises the bending optical system. The bending optical system has a first optical axis A1, a second optical axis A2, and a third optical axis A3. The second optical axis A2 is an optical axis that is bent at an angle of 90° from the first optical axis A1. The third optical axis A3 is an optical axis that is bent at an angle of 90° from the second optical axis A2.

The incident-side end part 14A is non-rotatably mounted on the body part 12. The intermediate part 14B is rotatable about the first optical axis A1 with respect to the incident-side end part 14A. Since the emission-side end part 14C is connected to the intermediate part 14B, the emission-side end part 14C is also rotated about the first optical axis A1 in a case where the intermediate part 14B is rotated with respect to the incident-side end part 14A. A rotatable range about the first optical axis A1 is less than 360°, and is 180° in this example. The reason why the rotatable range about the first optical axis A1 is limited to less than 360° is to prevent interference between the protruding portion 12B and the projection lens 11 in a state where the protruding portion 12B is adjacent to the incident-side end part 14A.

Further, the emission-side end part 14C is rotatable about the second optical axis A2 with respect to the intermediate part 14B. The rotation of the emission-side end part 14C about the second optical axis A2 is not limited unlike the case of the intermediate part 14B. For example, the emission-side end part 14C can also be rotated at an angle of 360° or more.

In summary, the emission-side end part 14C is rotatable about two axes, which are the first optical axis A1 and the second optical axis A2, as rotation axes. Accordingly, a user can change the projection direction of the projection lens 11 without moving the body part 12.

FIG. 2 shows a state where the projector 10 is horizontally placed on an installation surface 18, and FIG. 3 shows a state where the projector 10 is vertically placed on the installation surface 18. As described above, the projector 10 can be used in a horizontal attitude and a vertical attitude.

As shown in FIG. 3, an operation panel 22 is provided on the side surface 12D of the protruding portion 12B. The operation panel 22 includes a plurality of operation switches. The operation switches are, for example, a power switch, adjustment switches, and the like. The adjustment switches are switches that are used to perform various adjustments. The adjustment switches include, for example, switches that are used to perform the image quality adjustment and keystone correction of an image projected on the screen 36.

A first unlock switch 24A and a second unlock switch 24B are provided on one surface of the intermediate part 14B. As described later, the projection lens 11 is provided with a first rotation locking mechanism and a second rotation locking mechanism. The first rotation locking mechanism locks the rotation of the intermediate part 14B about the first optical axis A1 with respect to the incident-side end part 14A. The second rotation locking mechanism locks the rotation of the emission-side end part 14C about the second optical axis A2 with respect to the intermediate part 14B. The first unlock switch 24A is an operation switch that inputs an instruction to unlock the rotation of the intermediate part 14B to the first rotation locking mechanism. The second unlock switch 24B is an operation switch that inputs an instruction to unlock the rotation of the emission-side end part 14C to the second rotation locking mechanism.

As shown in FIG. 4, the body part 12 is provided with the image forming unit 26. The image forming unit 26 forms an image to be projected. The image forming unit 26 comprises an image forming panel 32, a light source 34, a light guide member (not shown), and the like. The light source 34 applies light to the image forming panel 32. The light guide member guides light, which is applied from the light source 34, to the image forming panel 32. The image forming unit 26 is, for example, a reflection type image forming unit that uses a DMD as the image forming panel 32. As well known, the DMD is an image display element which includes a plurality of micro-mirrors capable of changing the reflection direction of light applied from the light source 34 and in which the respective micro-mirrors are two-dimensionally arranged in pixels. The DMD performs optical modulation corresponding to an image by changing the direction of each micro-mirror according to an image to switch the ON/OFF of reflected light of light applied from the light source 34.

Examples of the light source 34 include a white light source. The white light source emits white light. The white light source is, for example, a light source that is realized from the combination of a laser light source and a phosphor. The laser light source emits blue light to the phosphor as excitation light. The phosphor emits yellow light in a case where the phosphor is excited by blue light emitted from the laser light source. The white light source emits white light by combining blue light that is emitted from the laser light source with yellow light that is emitted from the phosphor. The image forming unit 26 is further provided with a rotary color filter that selectively converts white light emitted from the light source 34 into each of blue light B (Blue), green light G (Green), and red light R (Red) in a time-sharing manner. In a case where each of blue light B, green light G, and red light R is selectively applied to the image forming panel 32, image light where image information about each of blue light B, green light G, and red light R is carried and supported is obtained. In a case where each color image light obtained in this way is selectively incident on the projection lens 11, each color image light is projected toward the screen 36. The respective color image lights are integrated with each other on the screen 36, so that a full color image P is displayed on the screen 36.

Figure 5:
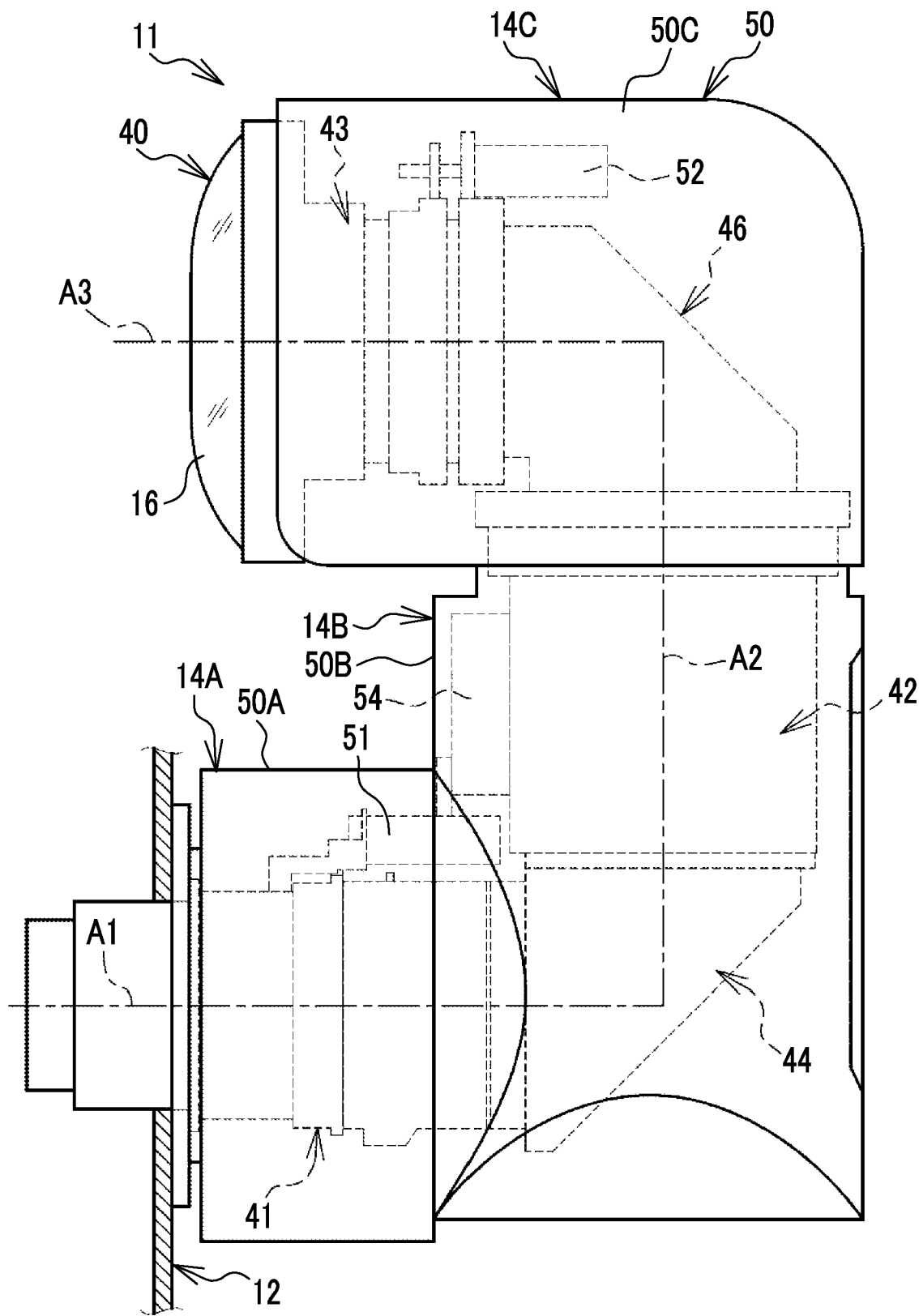
FIG. 5 is a side view of a projection lens.
Figure 6:
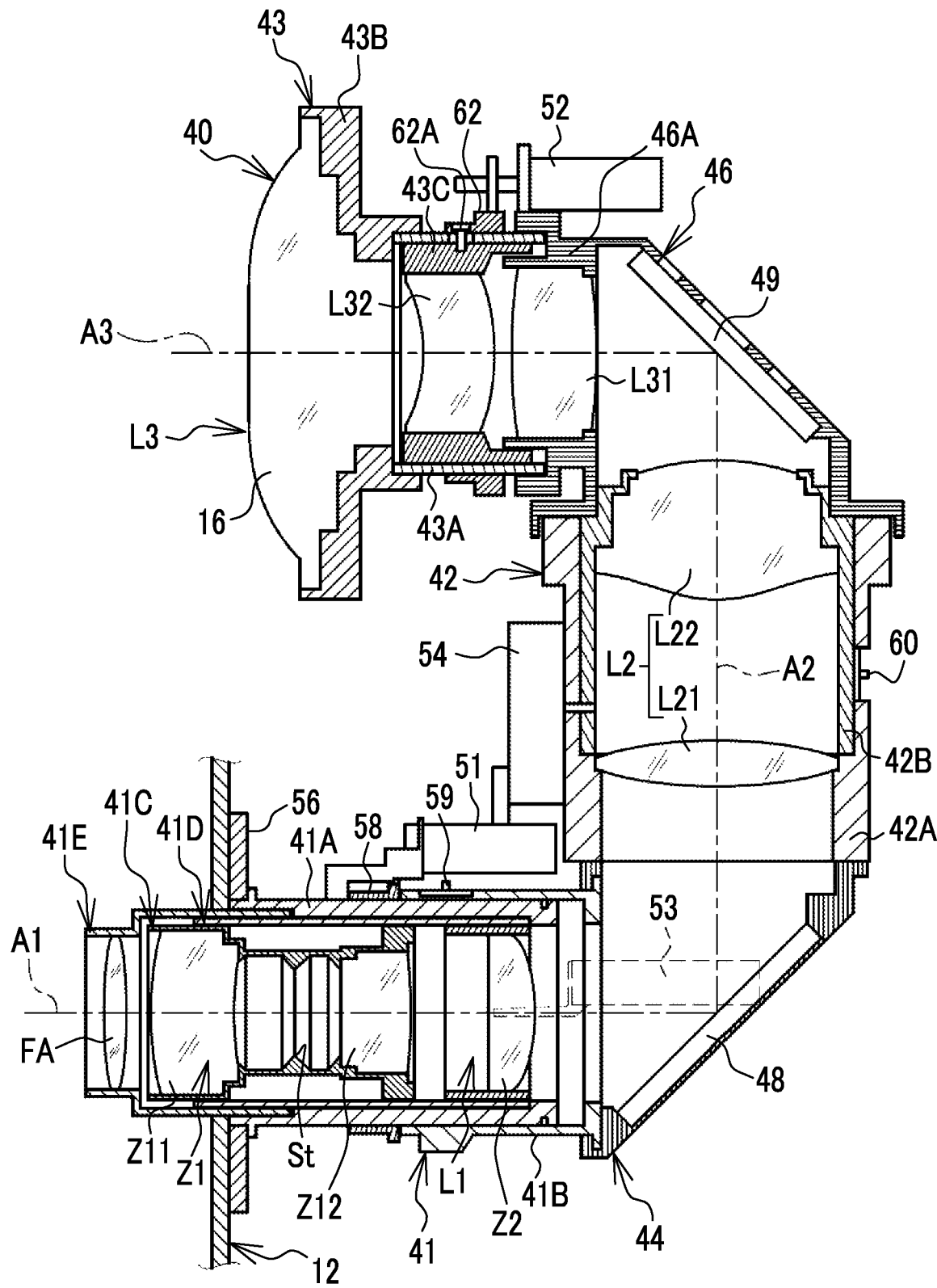
FIG. 6 is a longitudinal sectional view of the projection lens.

As shown in FIGS. 5 and 6, the projection lens 11 comprises a lens barrel 40. The lens barrel 40 houses the bending optical system. The lens barrel 40 comprises a first lens barrel unit 41, a second lens barrel unit 42, and a third lens barrel unit 43.

Each of the first lens barrel unit 41, the second lens barrel unit 42, and the third lens barrel unit 43 houses lenses. The lenses housed in the first lens barrel unit 41 are disposed on the first optical axis A1. The lenses housed in the second lens barrel unit 42 are disposed on the second optical axis A2. The lenses housed in the third lens barrel unit 43 are disposed on the third optical axis A3. The central axis of the first lens barrel unit 41 substantially coincides with the first optical axis A1. The central axis of the second lens barrel unit 42 substantially coincides with the second optical axis A2. The central axis of the third lens barrel unit 43 substantially coincides with the third optical axis A3. FIGS. 5 and 6 show the lens barrel 40 in the state shown in FIGS. 2 and 4. In this embodiment, in order to simplify description, the detailed configuration of the respective lenses will be omitted and the respective lenses will be represented like one lens. However, each lens may be a plurality of lenses.

The first lens barrel unit 41 is a lens barrel unit that is positioned closest to the incident side, the third lens barrel unit 43 is a lens barrel unit that is positioned closest to the emission side, and the second lens barrel unit 42 is a lens barrel unit that is positioned between the first lens barrel unit 41 and the third lens barrel unit 43.

In addition, the lens barrel 40 comprises a first mirror holding part 44 and a second mirror holding part 46. The first mirror holding part 44 holds a first mirror 48 and the second mirror holding part 46 holds a second mirror 49. Each of the first and second mirrors 48 and 49 is one of optical elements forming the bending optical system and is a reflective part that bends an optical axis. The first mirror 48 bends the first optical axis A1 to form the second optical axis A2. The second mirror 49 bends the second optical axis A2 to form the third optical axis A3. The first mirror holding part 44 is disposed between the first lens barrel unit 41 and the second lens barrel unit 42. The second mirror holding part 46 is disposed between the second lens barrel unit 42 and the third lens barrel unit 43.

The lens barrel 40 is covered with an exterior cover 50 except for a part of the emission lens 16 and the like. The exterior cover 50 includes a first exterior cover 50A, a second exterior cover 50B, and a third exterior cover 50C. The first exterior cover 50A is an exterior cover corresponding to the incident-side end part 14A, the second exterior cover 50B is an exterior cover corresponding to the intermediate part 14B, and the third exterior cover 50C is an exterior cover corresponding to the emission-side end part 14C.

The first exterior cover 50A covers the first lens barrel unit 41 and forms the outer peripheral surface of the incident-side end part 14A. The second exterior cover 50B mainly covers the first mirror holding part 44 and the second lens barrel unit 42, and forms the outer peripheral surface of the intermediate part 14B. The third exterior cover 50C mainly covers the second mirror holding part 46 and the third lens barrel unit 43, and forms the outer peripheral surface of the emission-side end part 14C.

Further, various actuators are disposed on the outer peripheral surface of the lens barrel 40. Specifically, a zoom motor 51 is provided on the outer peripheral surface of the first lens barrel unit 41 and a focus motor 52 is provided on the outer peripheral surface of the second mirror holding part 46. Further, a solenoid 53 (see FIG. 6) is provided on the outer peripheral surface of the first mirror holding part 44, and a solenoid 54 is provided on the outer peripheral surface of the second lens barrel unit 42. The solenoid 53 forms the first rotation locking mechanism. The solenoid 54 forms the second rotation locking mechanism.

In FIG. 6, the first lens barrel unit 41 comprises an inner barrel 41A, an outer barrel 41B, a zoom lens barrel 41C, a cam barrel 41D, and a focus adjustment barrel 41E. A flange 56, which protrudes outward in the radial direction of the inner barrel 41A, is provided at an incident-side end portion of the inner barrel 41A on the first optical axis A1. The flange 56 is fixed to the body part 12 so that the inner barrel 41A is not rotatable. The outer barrel 41B is disposed on the emission side of the inner barrel 41A, and covers a part of the outer peripheral surface of the inner barrel 41A. The outer barrel 41B is mounted on the inner barrel 41A so as to be rotatable about the first optical axis A1.

The first lens barrel unit 41 holds a first optical system L1. The first optical system L1 is composed of, for example, a lens FA, a lens group Z1, and a lens Z2 and is disposed on the first optical axis A1. The lens group Z1 is composed of a lens Z11 and a lens Z12. The cam barrel 41D and the zoom lens barrel 41C are housed in the inner barrel 41A. The zoom lens barrel 41C includes two groups of zoom lenses. The two groups of zoom lenses are composed of the lens group Z1 and the lens Z2.

A first cam groove (not shown) and a second cam groove (not shown) are formed on the cam barrel 41D. The first cam groove is a cam groove that is used to move the lens group Z1. The second cam groove is a cam groove that is used to move the lens Z2. A lens holding frame of the lens group Z1 is provided with a first cam pin (not shown). A lens holding frame of the lens Z2 is provided with a second cam pin (not shown). The first cam pin is inserted into the first cam groove and the second cam pin is inserted into the second cam groove.

In a case where the cam barrel 41D is rotated about the first optical axis A1, the lens group Z1 is moved along the first cam groove and the first optical axis A1 and the lens Z2 is moved along the second cam groove and the first optical axis A1. In a case where the lens group Z1 and the lens Z2 are moved along the first optical axis A1 as described above, the position of the lens group Z1 on the first optical axis is changed, the position of the lens Z2 on the first optical axis A1 is changed, and an interval between the lens group Z1 and the lens Z2 is changed. Accordingly, zooming is performed.

The cam barrel 41D is rotated by the drive of the zoom motor 51. A cylindrical gear 58 is provided on the outside of the inner barrel 41A. The gear 58 is rotated around the inner barrel 41A by the drive of the zoom motor 51. The gear 58 is provided with a drive pin (not shown) that is used to rotate the cam barrel 41D. In a case where the gear 58 is rotated, the drive pin is also rotated in the circumferential direction of the inner barrel 41A and the cam barrel 41D is rotated as the drive pin is rotated. In order to prevent interference with the drive pin, an insertion groove (not shown) into which the drive pin is to be inserted is formed on the inner barrel 41A in the circumferential direction.

Further, a stationary stop St is provided between the lenses Z11 and Z12 in the zoom lens barrel 41C. The stationary stop St narrows luminous flux incident from the body part 12. Since the stationary stop St is provided in the zoom lens barrel 41C, a telecentric optical system in which the size of an image is not changed at the center and the periphery of an image forming plane regardless of the incident height of luminous flux is realized.

The focus adjustment barrel 41E is mounted on the incident-side end portion of the inner barrel 41A and is rotatable about the first optical axis A1 with respect to the inner barrel 41A. A thread groove is formed on each of the outer peripheral surface of an emission-side end portion of the focus adjustment barrel 41E and the inner peripheral surface of the inner barrel 41A, and the respective thread grooves mesh with each other. Since the inner barrel 41A is fixed to the body part 12, the focus adjustment barrel 41E is moved along the first optical axis A1 due to the action of threads in a case where the focus adjustment barrel 41E is rotated with respect to the inner barrel 41A.

The focus adjustment barrel 41E holds a lens FA for adjusting a focus. The lens FA is moved along the first optical axis A1 to adjust the relative position of the focusing position of the entire system of the projection lens 11 relative to the image forming panel 32. In a case where the projection lens 11 is mounted on the body part 12, an individual difference occurs in the mounting position of the projection lens 11 relative to the image forming panel 32. The focus adjustment barrel 41E is provided to absorb this individual difference occurring during manufacture so that the relative position of the focusing position of the entire system of the projection lens 11 relative to the image forming panel 32 is substantially constant.

A first rotational position detection sensor 59 is provided on the outer peripheral surface of the outer barrel 41B. The first rotational position detection sensor 59 detects the rotational position of the outer barrel 41B with respect to the inner barrel 41A.

The first mirror holding part 44 is integrally mounted on an emission-side end portion of the outer barrel 41B. For this reason, the first mirror holding part 44 is rotated about the first optical axis A1 as the outer barrel 41B is rotated about the first optical axis A1 with respect to the inner barrel 41A. The first mirror holding part 44 holds the first mirror 48 in an attitude where the reflective surface of the first mirror 48 forms an angle of 45° with respect to each of the first optical axis A1 and the second optical axis A2. The first mirror 48 is a specular reflection mirror of which a transparent member, such as glass, is coated with a reflective film.

The second lens barrel unit 42 comprises an outer barrel 42A and an inner barrel 42B. An incident-side end portion of the outer barrel 42A is integrally mounted on the first mirror holding part 44. The inner barrel 42B is mounted on the outer barrel 42A so as to be rotatable about the second optical axis A2.

The second lens barrel unit 42 holds a second optical system L2. The second optical system L2 is composed of, for example, a lens L21 and a lens L22 and is disposed on the second optical axis A2. The outer barrel 42A holds the lens L21. The inner barrel 42B holds the lens L22.

In this example, the second optical system L2 functions as a relay lens. More specifically, the first optical system L1 of the first lens barrel unit 41 forms an intermediate image in the first mirror holding part 44. The second optical system L2 uses this intermediate image as a subject and relays luminous flux representing the intermediate image to the second mirror holding part 46 and the third lens barrel unit 43.

The second mirror holding part 46 is integrally mounted on an emission-side end portion of the inner barrel 42B of the second lens barrel unit 42. For this reason, the second mirror holding part 46 is rotated about the second optical axis A2 as the inner barrel 42B is rotated about the second optical axis A2 with respect to the outer barrel 42A.

A second rotational position detection sensor 60 is provided on the outer peripheral surface of the outer barrel 42A. The second rotational position detection sensor 60 detects the rotational position of the inner barrel 42B with respect to the outer barrel 42A.

The second mirror holding part 46 holds the second mirror 49 in an attitude where the reflective surface of the second mirror 49 forms an angle of 45° with respect to each of the second optical axis A2 and the third optical axis A3. The second mirror 49 is the same specular reflection mirror as the first mirror 48.

An emission-side end portion 46A of the second mirror holding part 46 forms the third lens barrel unit 43. The third lens barrel unit 43 comprises a stationary barrel 43A, an emission lens holding frame 43B, and a focus lens barrel 43C in addition to the end portion 46A.

The third lens barrel unit 43 holds a third optical system L3. The third optical system L3 is an emission optical system, is composed of, for example, a lens L31, a lens L32, and the emission lens 16, and is disposed on the third optical axis A3. The end portion 46A is a tubular portion of which the central axis substantially coincides with the third optical axis A3, and functions as a lens holding frame that holds the lens L31.

The stationary barrel 43A is integrally mounted on the emission side of the end portion 46A. The emission lens holding frame 43B is integrally mounted on an emission-side end portion of the stationary barrel 43A. The stationary barrel 43A holds the focus lens barrel 43C on the inner peripheral side thereof so that the focus lens barrel 43C is movable in the direction of the third optical axis A3. The focus lens barrel 43C holds the lens L32 for focus.

A gear 62 is provided on the outer periphery of the stationary barrel 43A. The gear 62 is rotated in the circumferential direction of the stationary barrel 43A by the drive of the focus motor 52. A thread groove is formed on the inner peripheral surface of the gear 62. A thread groove is formed even on the outer peripheral surface of the stationary barrel 43A. The thread groove formed on the inner peripheral surface of the gear 62 and the thread groove formed on the outer peripheral surface of the stationary barrel 43A mesh with each other. For this reason, in a case where the gear 62 is rotated, the gear 62 is moved with respect to the stationary barrel 43A in the direction of the third optical axis A3. The gear 62 is provided with a drive pin 62A, and the drive pin 62A is inserted into the focus lens barrel 43C. Accordingly, as the gear 62 is moved, the focus lens barrel 43C is also moved along the third optical axis A3. A focusing position depending on a distance between the screen 36 and the projection lens 11 is adjusted as the focusing position of the projection lens 11 by the movement of the focus lens barrel 43C.

Figure 7:
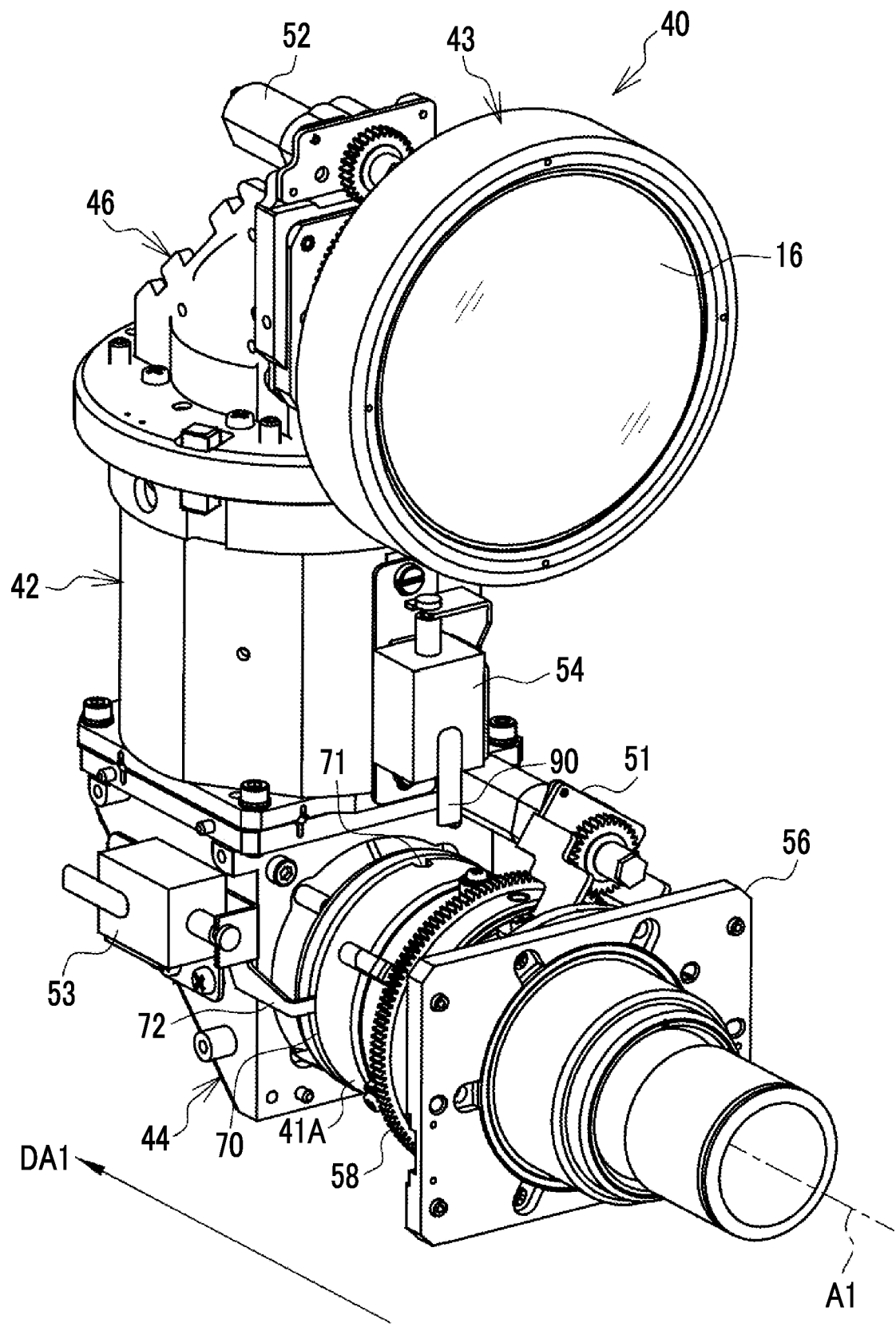
FIG. 7 is a perspective view of a lens barrel from which an outer barrel of a first lens barrel unit is removed.

In FIG. 7 showing the lens barrel 40 from which the outer barrel 41B of the first lens barrel unit 41 is removed, a guide groove 70 is formed over the entire inner barrel 41A in the circumferential direction. Further, lock grooves 71 are formed at intervals of 90° at the guide groove 70. The lock grooves 71 have a U-shape extending in an extending direction DA1 of the first optical axis A1. The lock grooves 71 correspond to a groove that is provided to lock the rotation of a second holding unit.

An arm 72 is mounted on the solenoid 53. The arm 72 extends in the extending direction DA1 of the first optical axis A1, and the distal end of the arm 72 is bent at a right angle toward the inner barrel 41A. The arm 72 is moved in the extending direction DA1 of the first optical axis A1 as the solenoid 53 is turned on/off with the turn-on/off of the first unlock switch 24A (see FIG. 4).

In more detail, in a case where the first unlock switch 24A is turned on and the solenoid 53 is turned on, the arm 72 is moved to a position where the distal end of the arm 72 is engaged with the guide groove 70 as shown in A of FIG. 8. Since the arm 72 is moved to the position where the distal end of the arm 72 is engaged with the guide groove 70 in this way, the outer barrel 41B can be rotated about the first optical axis A1 with respect to the inner barrel 41A.

On the other hand, in a case where the first unlock switch 24A is turned off and the solenoid 53 is turned off at a position where the lock groove 71 is present, the arm 72 is moved to a position where the distal end of the arm 72 is fitted to the lock groove 71 as shown in B of FIG. 8. Since the arm 72 is moved to the position where the distal end of the arm 72 is fitted to the lock groove 71 in this way, the rotation of the outer barrel 41B about the first optical axis A1 with respect to the inner barrel 41A is locked. That is, the lock groove 71 and the arm 72 form the first rotation locking mechanism in addition to the solenoid 53.

Insertion holes 73 are elongated holes that are formed at the outer barrel 41B and extend in the extending direction DA1 of the first optical axis A1. The distal end of the arm 72 is inserted into the insertion hole 73.

The second rotation locking mechanism also has the same structure as the first rotation locking mechanism as shown in A and B of FIG. 9. That is, the second rotation locking mechanism includes lock grooves 80 formed at the inner barrel 42B of the second lens barrel unit 42 and an arm 81 that is mounted on the solenoid 54 in addition to the solenoid 54. The lock grooves 80 are formed at intervals of 90° at a guide groove 82 that is formed over the entire inner barrel 42B in the circumferential direction. The arm 81 is moved in an extending direction DA2 of the second optical axis A2 as the solenoid 54 is turned on/off with the turn-on/off of the second unlock switch 24B (see FIG. 4).

In more detail, in a case where the second unlock switch 24B is turned on and the solenoid 54 is turned on, the arm 81 is moved to a position where the distal end of the arm 81 is engaged with the guide groove 82 as shown in A of FIG. 9. Since the arm 81 is moved to the position where the distal end of the arm 81 is engaged with the guide groove 82 in this way, the inner barrel 42B can be rotated about the second optical axis A2 with respect to the outer barrel 42A.

On the other hand, in a case where the second unlock switch 24B is turned off and the solenoid 54 is turned off at a position where the lock groove 80 is present, the arm 81 is moved to a position where the distal end of the arm 81 is fitted to the lock groove 80 as shown in B of FIG. 9. Since the arm 81 is moved to the position where the distal end of the arm 81 is fitted to the lock groove 80 in this way, the rotation of the inner barrel 42B about the second optical axis A2 with respect to the outer barrel 42A is locked.

Insertion holes 83 are elongated holes that are formed at the outer barrel 42A and extend in the extending direction DA2 of the second optical axis A2. The distal end of the arm 81 is inserted into the insertion hole 83.

Here, the first lens barrel unit 41 is an example of a first holding unit. The first mirror holding part 44 and the second lens barrel unit 42 are an example of a second holding unit. The second mirror holding part 46 and the third lens barrel unit 43 are an example of a third holding unit.

Further, the solenoid 53 and the arm 72 are an example of a first rotation control unit. The zoom motor 51 is an example of a first electric drive unit. The solenoid 54 and the arm 81 are an example of a second rotation control unit. The focus motor 52 is an example of a second electric drive unit.

In FIG. 10, the solenoid 53 and the arm 72 are provided on an outer peripheral surface 44_PS of the first mirror holding part 44. Since the solenoid 53 and the arm 72 are an example of the first rotation control unit as described above, the outer peripheral surface 44_PS of the first mirror holding part 44 on which the solenoid 53 and the arm 72 are provided corresponds to a first outer peripheral surface.

The zoom motor 51 is provided on an outer peripheral surface 41A_PS of the inner barrel 41A. Since the zoom motor 51 is an example of the first electric drive unit as described above, the outer peripheral surface 41A_PS of the inner barrel 41A on which the zoom motor 51 is provided corresponds to a second outer peripheral surface.

The solenoid 54 is provided on an outer peripheral surface 42A_PS of the outer barrel 42A. Since the solenoid 54 is an example of the second rotation control unit as described above, the outer peripheral surface 42A_PS of the outer barrel 42A on which the solenoid 54 is provided corresponds to a third outer peripheral surface described in a claim and a first outer peripheral surface described in claims.

The arm 72 and the zoom motor 51 are in a relationship where the arm 72 and the zoom motor 51 overlap with each other in the extending direction DA1 of the first optical axis A1 as shown by reference numeral OL1. In other words, the arm 72 overlaps with the zoom motor 51 in the extending direction DA1 of the first optical axis A1. That is, the arm 72 is an example of an extending part of the first rotation control unit extending toward the second outer peripheral surface.

The solenoid 54 includes an extending part 90 extending in the extending direction DA2 of the second optical axis A2. As with arm 72 and the zoom motor 51, the extending part 90 and the zoom motor 51 are in a relationship where the extending part 90 and the zoom motor 51 overlap with each other in the extending direction DA2 of the second optical axis A2 as shown by reference numeral OL2. In other words, the extending part 90 overlaps with the zoom motor 51 in the extending direction DA2 of the second optical axis A2.

In FIG. 11, the focus motor 52 is provided on an outer peripheral surface 46A_PS of the end portion 46A of the second mirror holding part 46. In more detail, the focus motor 52 is provided on the side of the outer peripheral surface 46A_PS corresponding to the extending direction DA2 of the second optical axis A2. Since the focus motor 52 is an example of the second electric drive unit as described above, the outer peripheral surface 46A_PS of the end portion 46A on which the focus motor 52 is provided corresponds to a fourth outer peripheral surface.

FIGS. 12A, 12B, and 12C are plan views showing a positional relationship between the zoom motor 51 and the solenoids 53 and 54 in a case where the lens barrel 40 is viewed from the body part 12. FIG. 12A shows the positional relationship in the storage state shown in FIG. 1 and the like. FIG. 12B shows the positional relationship in the state shown in FIGS. 2 and 4 and the like. FIG. 12C shows the positional relationship in a state where the outer barrel is rotated to a side opposite to the state shown in FIGS. 2 and 4 and the like. In the following description, the extending direction DA2 of the second optical axis A2 in a state shown in FIG. 12A will be defined and described as the direction of 9 o'clock of a clock. Further, as another expression, the extending direction DA2 of the second optical axis A2 in the state shown in FIG. 12A will be defined and described as the vicinity of a boundary between a second quadrant Q2 (90°<θ<180°) and a third quadrant Q3 (180°<θ<270°) in a case where an angle about the first optical axis A1 is used.

The zoom motor 51 is provided on the outer peripheral surface 41A_PS of the inner barrel 41A that is fixed to the body part 12 through the flange 56. For this reason, the position of the zoom motor 51 is fixed in any case of FIGS. 12A to 12C and is a position between the direction of 12 o'clock and the direction of 3 o'clock. In other words, the zoom motor 51 is fixed in a first quadrant Q1 (0°<θ<90°) in a case where an angle about the first optical axis A1 is used.

On the other hand, since the solenoid 53 is provided on the outer peripheral surface 44_PS of the first mirror holding part 44 that is rotated with respect to the inner barrel 41A, the position of the solenoid 53 is changed as the first mirror holding part 44 is rotated. That is, the solenoid 53 is present at a position corresponding to the direction of 6 o'clock in the case of FIG. 12A, is present at a position corresponding to the direction of 9 o'clock in the case of FIG. 12B, and is present at a position corresponding to the direction of 3 o'clock in the case of FIG. 12C. In other words, the solenoid 53 is present in the vicinity of a boundary between the third quadrant Q3 and a fourth quadrant Q4 (270°<θ<360°) in FIG. 12A in a case where an angle about the first optical axis A1 is used. Further, the solenoid 53 is present in the vicinity of a boundary between the second quadrant Q2 and the third quadrant Q3 in the case of FIG. 12B, and is present in the vicinity of a boundary between the first quadrant Q1 and the fourth quadrant Q4 in the case of FIG. 12C.

Since the solenoid 54 is also provided on the outer peripheral surface 42A_PS of the outer barrel 42A that is rotated with respect to the inner barrel 41A as with the solenoid 53, the position of the solenoid 54 is changed as the outer barrel 42A is rotated. That is, the solenoid 54 is present at a position corresponding to the direction of 9 o'clock in the case of FIG. 12A, is present at a position corresponding to the direction of 12 o'clock in the case of FIG. 12B, and is present at a position corresponding to the direction of 6 o'clock in the case of FIG. 12C. In other words, the solenoid 54 is present in the vicinity of a boundary between the second quadrant Q2 and the third quadrant Q3 in FIG. 12A in a case where an angle about the first optical axis A1 is used. Further, the solenoid 54 is present in the vicinity of a boundary between the first quadrant Q1 and the second quadrant Q2 in the case of FIG. 12B, and is present in the vicinity of a boundary between the third quadrant Q3 and the fourth quadrant Q4 in the case of FIG. 12C.

Each of FIGS. 13 and 14 is one diagram in which the states of FIGS. 12A to 12C are collectively shown. FIG. 13 is a plan view showing a positional relationship between the zoom motor 51 and the solenoid 53. On the other hand, FIG. 14 is a plan view showing a positional relationship between the zoom motor 51 and the solenoid 54.

As shown in FIG. 13, the zoom motor 51 and the solenoid 53 are spaced apart from each other in a rotatable range RR of the first mirror holding part 44 and the second lens barrel unit 42 (see FIG. 6) about the first optical axis A1. Further, the zoom motor 51 and the solenoid 53 are provided at positions that correspond to each other so as to be shifted from each other in a rotation direction DR of the first mirror holding part 44 and the second lens barrel unit 42.

As shown in FIG. 14, the zoom motor 51 and the solenoid 54 are spaced apart from each other in the rotatable range RR of the first mirror holding part 44 and the second lens barrel unit 42 about the first optical axis A1. Further, the zoom motor 51 and the solenoid 54 are provided at positions that correspond to each other so as to be shifted from each other in the rotation direction DR of the first mirror holding part 44 and the second lens barrel unit 42.

Next, the action of the above-mentioned configuration will be described. In a case where the projector 10 is in use, a user rotates the first mirror holding part 44 and the second lens barrel unit 42 about the first optical axis A1 with respect to the first lens barrel unit 41. Further, the user rotates the second mirror holding part 46 and the third lens barrel unit 43 about the second optical axis A2 with respect to the first mirror holding part 44 and the second lens barrel unit 42.

The arm 72 of the solenoid 53 and the zoom motor 51 are in a relationship where the arm 72 of the solenoid 53 and the zoom motor 51 overlap with each other in the extending direction DA1 of the first optical axis A1 as shown in FIG. 10 by reference numeral OL1. Further, the extending part 90 of the solenoid 54 and the zoom motor 51 are in a relationship where the extending part 90 of the solenoid 54 and the zoom motor 51 overlap with each other in the extending direction DA2 of the second optical axis A2 as shown in FIG. 10 by reference numeral OL2. For this reason, in a case where the first mirror holding part 44 and the second lens barrel unit 42 are rotated about the first optical axis A1 with respect to the first lens barrel unit 41, there is a concern that the arm 72 and the zoom motor 51 may bump against each other or the extending part 90 and the zoom motor 51 may bump against each other and the rotation of the first mirror holding part 44 and the second lens barrel unit 42 may be hindered.

However, in this example, the zoom motor 51 and the solenoid 53 are spaced apart from each other in the rotatable range RR of the first mirror holding part 44 and the second lens barrel unit 42 about the first optical axis A1 as shown in FIGS. 12A, 12B, and 12C and FIG. 13. In more detail, the zoom motor 51 and the solenoid 53 are provided at positions that correspond to each other so as to be shifted from each other in the rotation direction DR of the first mirror holding part 44 and the second lens barrel unit 42. Further, the zoom motor 51 and the solenoid 54 are spaced apart from each other in the rotatable range RR of the first mirror holding part 44 and the second lens barrel unit 42 about the first optical axis A1 as shown in FIGS. 12A, 12B, and 12C and FIG. 14. In more detail, the zoom motor 51 and the solenoid 54 are provided at positions that correspond to each other so as to be shifted from each other in the rotation direction DR of the first mirror holding part 44 and the second lens barrel unit 42. Accordingly, there is no concern that the arm 72 and the zoom motor 51 may bump against each other or the extending part 90 and the zoom motor 51 may bump against each other and the rotation of the first mirror holding part 44 and the second lens barrel unit 42 may be hindered.

As shown in A and B of FIG. 8 and the like, the distal end of the arm 72 is fitted to the lock grooves 71 formed at the inner barrel 41A to lock the rotation of the first mirror holding part 44 and the second lens barrel unit 42. Accordingly, the rotation of the first mirror holding part 44 and the second lens barrel unit 42 can be locked.

The second mirror holding part 46 and the third lens barrel unit 43 (see FIG. 6) are rotated about the second optical axis A2 by an angle of 360° with respect to the first mirror holding part 44 and the second lens barrel unit 42. Here, a case where the solenoid 54 and the focus motor 52 are in a relationship where the solenoid 54 and the focus motor 52 overlap with each other as with the arm 72 and the zoom motor 51 and the extending part 90 and the zoom motor 51 will be considered. In this case, in a case where the second mirror holding part 46 and the third lens barrel unit 43 are rotated about the second optical axis A2 with respect to the first mirror holding part 44 and the second lens barrel unit 42, there is a concern that the solenoid 54 and the focus motor 52 may bump against each other and the rotation of the second mirror holding part 46 and the third lens barrel unit 43 may be hindered.

However, since the solenoid 54 is provided on the outer peripheral surface 42A_PS of the outer barrel 42A and the focus motor 52 is provided on the side of the outer peripheral surface 46A_PS of the end portion 46A corresponding to the extending direction DA2 of the second optical axis A2 as shown in FIG. 11 in this example, the solenoid 54 and the focus motor 52 are not in a relationship where the solenoid 54 and the focus motor 52 overlap with each other. Accordingly, there is no concern that the solenoid 54 and the focus motor 52 may bump against each other and the rotation of the second mirror holding part 46 and the third lens barrel unit 43 may be hindered.

An example where the arm 72 as an extending part overlaps with the zoom motor 51 in the extending direction DA1 of the first optical axis A1 as shown in FIG. 10 has been described in the embodiment, but the invention is not limited thereto. As shown in FIG. 15, the zoom motor 51 may include an extending part 100 extending toward the outer peripheral surface 44_PS of the first mirror holding part 44 and this extending part 100 may overlap with the solenoid 53 in the extending direction DA1 of the first optical axis A1 as shown by reference numeral OL3.

The rotatable range about the first optical axis A1 is not limited to 180° and may be, for example, 90°. In the embodiment, as shown in FIGS. 12A, 12B, and 12C, the solenoids 53 and 54 rotating together with the first mirror holding part 44 and the second lens barrel unit 42 are spaced apart from each other by an angle of about 90° about the first optical axis A1. Accordingly, even though the rotatable range of the second lens barrel unit 42 is 180°, the value of the sum of this rotatable range 180° and an angle of about 90° by which the solenoids 53 and 54 are spaced apart from each other is about 270° and is less than 360°. Therefore, the solenoids 53 and 54 do not come into contact with the zoom motor 51 in the rotatable range about the first optical axis A1. In other words, in a case where the rotatable range about the first optical axis A1 is denoted by θ1 and the absolute value of a difference in an angle about the first optical axis A1 between the solenoid 53 (first rotational movement control unit) and the solenoid 54 (second rotational movement control unit) is denoted by θ2, "θ1+θ2<360°" may be satisfied. However, strictly speaking, "θ1+θ2" is a value having a margin corresponding to an installation space for the zoom motor 51. In a case where for example, 20° is required for the installation space for the zoom motor 51, "θ1+θ2<340°" is satisfied.

An example where the solenoid 53 as the first rotation control unit is provided on the outer peripheral surface 44_PS of the first mirror holding part 44 and the zoom motor 51 as the first electric drive unit is provided on the outer peripheral surface 41A_PS of the inner barrel 41A has been described in the embodiment, but the invention is not limited thereto. The solenoid 53 may be provided on the outer peripheral surface (for example, the outer peripheral surface 41A_PS of the inner barrel 41A) of the first lens barrel unit 41, and the zoom motor 51 may be provided on the outer peripheral surface of the first mirror holding part 44 or the second lens barrel unit 42 (for example, the outer peripheral surface 44_PS of the first mirror holding part 44). In this case, the outer peripheral surface of the first lens barrel unit 41 is the first outer peripheral surface, and the outer peripheral surface of the first mirror holding part 44 or the second lens barrel unit 42 is the second outer peripheral surface.

Likewise, the solenoid 54 as the second rotation control unit may be provided on the outer peripheral surface of the first lens barrel unit 41, and the zoom motor 51 as the first electric drive unit may be provided on the outer peripheral surface of the first mirror holding part 44 or the second lens barrel unit 42. Further, the solenoid 54 as the second rotation control unit may be provided on the outer peripheral surface of the second mirror holding part 46 or the third lens barrel unit 43 (fourth outer peripheral surface), and the focus motor 52 as the second electric drive unit may be provided on the outer peripheral surface of the first mirror holding part 44 or the second lens barrel unit 42 (third outer peripheral surface).

Examples of the first and second electric drive units have included the zoom motor 51 and the focus motor 52 serving as optical system control units. However, as long as using electricity to control the mechanism of the projection lens 11, the electric drive units are not limited to the optical system control units. For example, the electric drive unit may be the rotation control unit for controlling the rotation of the second holding unit or the rotation control unit for controlling the rotation of the third holding unit. Further, for example, there is even a case where a projector 10 includes an electronic pen that is capable of drawing characters and the like on an image P displayed on a screen 36 as disclosed in JP2017-142726A. In this case, the electric drive unit may be a drive unit for an imaging element that images light generated with the drawing of the electronic pen.

The first rotation control unit is not limited to the solenoid 53 and the arm 72. The first rotation control unit may be a motor that is used to rotate the first mirror holding part 44 and the second lens barrel unit 42. The second rotation control unit is also not limited to the solenoid 54 and the arm 81 likewise, and may be a motor that is used to rotate the second mirror holding part 46 and the third lens barrel unit 43.

A transmission type image forming panel, which uses an LCD instead of a DMD, may be used as the image forming panel 32 corresponding to an electro-optical element. Alternatively, a panel using a self-luminous element, such as a light emitting diode (LED) and/or an organic electroluminescence (EL) display, instead of a DMD may be used. A total reflection type mirror may be used as the reflective part instead of a specular reflection mirror.

An example where a laser light source is used as the light source 34 has been described in the example, but the invention is not limited thereto. A mercury lamp and/or an LED may be used as the light source 34. Further, the blue laser light source and the yellow phosphor have been used in the example, but the invention is not limited thereto. A green phosphor and a red phosphor may be used instead of the yellow phosphor. Furthermore, a green laser light source and a red laser light source may be used instead of the yellow phosphor.

Additional claims relating to the second aspect of the projection lens and the projection device according to the embodiment of the disclosure will be described below.

[Additional Claim 1]

A projection lens that is mounted on a housing of a projection device including an electro-optical element, the projection lens comprising:

a first holding unit which is connected to the housing and through which light parallel to a first optical axis serving as an optical axis corresponding to luminous flux incident from the housing passes;

a second holding unit through which light parallel to a second optical axis obtained from bending of the light parallel to the first optical axis passes and which is rotated with respect to the first holding unit in a rotatable range less than 360°;

a first rotation control unit that switches locking and unlocking of rotation of the second holding unit or rotates the second holding unit; and a first electric drive unit that drives a first drive target serving as a part of a mechanism of the projection lens using electricity, wherein the first rotation control unit is provided on a first outer peripheral surface of one of the first holding unit and the second holding unit, the first electric drive unit is provided on a second outer peripheral surface of the other of the first holding unit and the second holding unit, the first rotation control unit and the first electric drive unit are in a relationship where the first rotation control unit and the first electric drive unit overlap with each other in an extending direction of the first optical axis, one of the first rotation control unit and the first electric drive unit is rotated as the second holding unit is rotated with respect to the first holding unit, the other of the first rotation control unit and the first electric drive unit is not rotated as the second holding unit is rotated with respect to the first holding unit, and the first rotation control unit and the first electric drive unit are spaced apart from each other in the rotatable range.

[Additional Claim 2]

The projection lens according to additional claim 1, wherein the first electric drive unit and the first rotation control unit are provided at positions that correspond to each other so as to be shifted from each other in a rotation direction of the second holding unit.

[Additional Claim 3]

The projection lens according to additional claim 1 or 2, wherein the first rotation control unit includes an extending part extending toward the second outer peripheral surface, and the extending part overlaps with the first electric drive unit in the extending direction of the first optical axis.

[Additional Claim 4]

The projection lens according to additional claim 3, wherein the extending part is fitted to a groove that is provided to lock the rotation of the second holding unit.

[Additional Claim 5]

The projection lens according to any one of additional claims 1 to 4, wherein the first electric drive unit includes an extending part extending toward the first outer peripheral surface, and the extending part overlaps with the first rotation control unit in the extending direction of the first optical axis.

[Additional Claim 6]

The projection lens according to any one of additional claims 1 to 5, further comprising:

a third holding unit through which light parallel to a third optical axis obtained from bending of the light parallel to the second optical axis passes and which is rotated by an angle of 360° with respect to the second holding unit;

a second rotation control unit that switches locking and unlocking of rotation of the third holding unit or rotates the third holding unit; and a second electric drive unit that drives a second drive target serving as a part of a mechanism of the projection lens using electricity, wherein one of the second rotation control unit and the second electric drive unit is provided on a third outer peripheral surface of the second holding unit and is rotated as the third holding unit is rotated with respect to the second holding unit, and the other of the second rotation control unit and the second electric drive unit is provided on one side of a fourth outer peripheral surface of the third holding unit corresponding to an extending direction of the second optical axis, and is not rotated as the third holding unit is rotated with respect to the second holding unit.

[Additional Claim 7]

A projection lens that is mounted on a housing of a projection device including an electro-optical element, the projection lens comprising:

a first holding unit which is connected to the housing and through which light parallel to a first optical axis serving as an optical axis corresponding to luminous flux incident from the housing passes;

a second holding unit through which light parallel to a second optical axis obtained from bending of the light parallel to the first optical axis passes and which is rotated with respect to the first holding unit in a rotatable range less than 360°;

a third holding unit through which light parallel to a third optical axis obtained from bending of the light parallel to the second optical axis passes and which is rotated with respect to the second holding unit;

a first rotation control unit that switches locking and unlocking of rotation of the second holding unit or rotates the second holding unit;

a second rotation control unit that switches locking and unlocking of rotation of the third holding unit or rotates the third holding unit; and a first electric drive unit that drives a first drive target serving as a part of a mechanism of the projection lens using electricity, wherein the second rotation control unit is provided on a first outer peripheral surface of one of the first holding unit and the second holding unit, the first electric drive unit is provided on a second outer peripheral surface of the other of the first holding unit and the second holding unit, one of the second rotation control unit and the first electric drive unit is rotated as the second holding unit is rotated with respect to the first holding unit, the other of the second rotation control unit and the first electric drive unit is not rotated as the second holding unit is rotated with respect to the first holding unit, the second rotation control unit and the first electric drive unit are in a relationship where the second rotation control unit and the first electric drive unit overlap with each other in an extending direction of the second optical axis, and the second rotation control unit and the first electric drive unit are spaced apart from each other in the rotatable range.

[Additional Claim 8]

The projection lens according to additional claim 6 or 7, wherein the first electric drive unit and the second rotation control unit are provided at positions that correspond to each other so as to be shifted from each other in a rotation direction of the second holding unit.

[Additional Claim 9]

The projection lens according to additional claim 7 or 8, further comprising:

a second electric drive unit that drives a second drive target serving as a part of a mechanism of the projection lens using electricity, wherein the third holding unit is rotated by an angle of 360° with respect to the second holding unit, and the second electric drive unit is provided on a fourth outer peripheral surface of the third holding unit and does not overlap with the second rotation control unit in the extending direction of the second optical axis.

[Additional Claim 10]

A projection device comprising:

an electro-optical element;

a housing that stores the electro-optical element and includes a central portion and a protruding portion protruding from the central portion;

a depressed portion that is adjacent to the protruding portion; and the projection lens according to any one of additional claims 1 to 9 that is disposed in the depressed portion and projects light emitted from the electro-optical element.

In this specification, "A and/or B" is synonymous with "at least one of A or B". That is, "A and/or B" may mean only A, may mean only B, or may mean a combination of A and B. Further, in this specification, the same meaning as "A and/or B" is applied even in a case where three or more items are expressed so as to be connected using "and/or".

The description contents and shown contents having been described above are the detailed description of portions according to the technique of the disclosure, and are merely an example of the technique of the disclosure. For example, the description of the configuration, functions, actions, and effects having been described above is the description of examples of the configuration, functions, actions, and effects of the portions according to the technique of the disclosure. Accordingly, it goes without saying that unnecessary portions may be deleted or new elements may be added or replaced in the description contents and shown contents described above without departing from the scope of the technique of the disclosure. Further, the description of common technical knowledge, which allows the technique of the disclosure to be embodied and does not need to be particularly described, is omitted in the description contents and shown contents, which have been described above, to avoid complication and to facilitate the understanding of portions according to the technique of the disclosure.

All documents, patent applications, and technical standards disclosed in this specification are incorporated in this specification by reference so that the incorporation of each of the documents, the patent applications, and the technical standards by reference is specific and is as detailed as that in a case where the documents, the patent applications, and the technical standards are described individually.

What is claimed is:

1. A projection lens that is mounted on a housing of a projection device including an electro-optical element, the projection lens comprising:

a first holding unit which is connected to the housing and through which light parallel to a first optical axis serving as an optical axis corresponding to luminous flux incident from the housing passes;

a second holding unit through which light parallel to a second optical axis obtained from bending of the light parallel to the first optical axis passes and which is rotated with respect to the first holding unit in a rotatable range less than 360';

a first rotation control unit that controls rotation of the second holding unit; and a first electric drive unit, wherein the first rotation control unit is provided on a first outer peripheral surface of one of the first holding unit and the second holding unit, the first electric drive unit is provided on a second outer peripheral surface of the other of the first holding unit and the second holding unit, the first rotation control unit and the first electric drive unit are in a relationship where the first rotation control unit and the first electric drive unit overlap with each other in an extending direction of the first optical axis, and the first rotation control unit and the first electric drive unit are spaced apart from each other in the rotatable range.

2. The projection lens according to claim 1, wherein the first electric drive unit and the first rotation control unit are provided at positions that correspond to each other so as to be shifted from each other in a rotation direction of the second holding unit.

3. The projection lens according to claim 1, wherein the first rotation control unit includes an extending part extending toward the second outer peripheral surface, and the extending part overlaps with the first electric drive unit in the extending direction of the first optical axis.

4. The projection lens according to claim 3, wherein the extending part is fitted to a groove that is provided to lock the rotation of the second holding unit.

5. The projection lens according to claim 1, wherein the first electric drive unit includes an extending part extending toward the first outer peripheral surface, and the extending part overlaps with the first rotation control unit in the extending direction of the first optical axis.

6. The projection lens according to claim 1, further comprising:

a third holding unit through which light parallel to a third optical axis obtained from bending of the light parallel to the second optical axis passes and which is rotated by an angle of 360° with respect to the second holding unit;

a second rotation control unit that controls rotation of the third holding unit; and a second electric drive unit, wherein one of the second rotation control unit and the second electric drive unit is provided on a third outer peripheral surface of the second holding unit, and the other of the second rotation control unit and the second electric drive unit is provided on one side of a fourth outer peripheral surface of the third holding unit corresponding to an extending direction of the second optical axis.

7. The projection lens according to claim 6, wherein the first electric drive unit and the second rotation control unit are provided at positions that correspond to each other so as to be shifted from each other in a rotation direction of the second holding unit.

8. The projection lens according to claim 2, wherein the first rotation control unit includes an extending part extending toward the second outer peripheral surface, and the extending part overlaps with the first electric drive unit in the extending direction of the first optical axis.

9. The projection lens according to claim 2, wherein the first electric drive unit includes an extending part extending toward the first outer peripheral surface, and the extending part overlaps with the first rotation control unit in the extending direction of the first optical axis.

10. The projection lens according to claim 3, wherein the first electric drive unit includes an extending part extending toward the first outer peripheral surface, and the extending part overlaps with the first rotation control unit in the extending direction of the first optical axis.

11. The projection lens according to claim 4, wherein the first electric drive unit includes an extending part extending toward the first outer peripheral surface, and the extending part overlaps with the first rotation control unit in the extending direction of the first optical axis.

12. The projection lens according to claim 2, further comprising:

a third holding unit through which light parallel to a third optical axis obtained from bending of the light parallel to the second optical axis passes and which is rotated by an angle of 360° with respect to the second holding unit;

a second rotation control unit that controls rotation of the third holding unit; and a second electric drive unit, wherein one of the second rotation control unit and the second electric drive unit is provided on a third outer peripheral surface of the second holding unit, and the other of the second rotation control unit and the second electric drive unit is provided on one side of a fourth outer peripheral surface of the third holding unit corresponding to an extending direction of the second optical axis.

13. The projection lens according to claim 3, further comprising:

a third holding unit through which light parallel to a third optical axis obtained from bending of the light parallel to the second optical axis passes and which is rotated by an angle of 360° with respect to the second holding unit;

a second rotation control unit that controls rotation of the third holding unit; and a second electric drive unit, wherein one of the second rotation control unit and the second electric drive unit is provided on a third outer peripheral surface of the second holding unit, and the other of the second rotation control unit and the second electric drive unit is provided on one side of a fourth outer peripheral surface of the third holding unit corresponding to an extending direction of the second optical axis.

14. The projection lens according to claim 4, further comprising:

a third holding unit through which light parallel to a third optical axis obtained from bending of the light parallel to the second optical axis passes and which is rotated by an angle of 360° with respect to the second holding unit;

a second rotation control unit that controls rotation of the third holding unit; and a second electric drive unit, wherein one of the second rotation control unit and the second electric drive unit is provided on a third outer peripheral surface of the second holding unit, and the other of the second rotation control unit and the second electric drive unit is provided on one side of a fourth outer peripheral surface of the third holding unit corresponding to an extending direction of the second optical axis.

15. The projection lens according to claim 5, further comprising:

a third holding unit through which light parallel to a third optical axis obtained from bending of the light parallel to the second optical axis passes and which is rotated by an angle of 360° with respect to the second holding unit;

a second rotation control unit that controls rotation of the third holding unit; and
a second electric drive unit,
wherein one of the second rotation control unit and the second electric drive unit is provided on a third outer peripheral surface of the second holding unit, and
the other of the second rotation control unit and the second electric drive unit is provided on one side of a fourth outer peripheral surface of the third holding unit corresponding to an extending direction of the second optical axis.

16. A projection device comprising:
an electro-optical element;
a housing that stores the electro-optical element and includes a central portion and a protruding portion protruding from the central portion;
a depressed portion that is adjacent to the protruding portion; and
the projection lens according to claim 1 that is disposed in the depressed portion and projects light emitted from the electro-optical element.

17. A projection lens that is mounted on a housing of a projection device including an electro-optical element, the projection lens comprising:
a first holding unit which is connected to the housing and through which light parallel to a first optical axis serving as an optical axis corresponding to luminous flux incident from the housing passes;
a second holding unit through which light parallel to a second optical axis obtained from bending of the light parallel to the first optical axis passes and which is rotated with respect to the first holding unit in a rotatable range less than 360';
a third holding unit through which light parallel to a third optical axis obtained from bending of the light parallel to the second optical axis passes and which is rotated with respect to the second holding unit;
a first rotation control unit that controls rotation of the second holding unit;
a second rotation control unit that controls rotation of the third holding unit; and
a first electric drive unit,
wherein the second rotation control unit is provided on a first outer peripheral surface of one of the first holding unit and the second holding unit,
the first electric drive unit is provided on a second outer peripheral surface of the other of the first holding unit and the second holding unit,
the second rotation control unit and the first electric drive unit are in a relationship where the second rotation control unit and the first electric drive unit overlap with each other in an extending direction of the second optical axis, and
the second rotation control unit and the first electric drive unit are spaced apart from each other in the rotatable range.

18. The projection lens according to claim 17,
wherein the first electric drive unit and the second rotation control unit are provided at positions that correspond to each other so as to be shifted from each other in a rotation direction of the second holding unit.

19. The projection lens according to claim 17, further comprising:
a second electric drive unit,
wherein the third holding unit is rotated by an angle of 360° with respect to the second holding unit, and
the second electric drive unit is provided on a fourth outer peripheral surface of the third holding unit and does not overlap with the second rotation control unit in the extending direction of the second optical axis.

20. The projection lens according to claim 19, further comprising:
a second electric drive unit,
wherein the third holding unit is rotated by an angle of 360° with respect to the second holding unit, and
the second electric drive unit is provided on a fourth outer peripheral surface of the third holding unit and does not overlap with the second rotation control unit in the extending direction of the second optical axis.

* * * * *